(12) United States Patent
Jariwala et al.

(10) Patent No.: US 12,157,929 B2
(45) Date of Patent: Dec. 3, 2024

(54) INTEGRATED LITHIUM EXTRACTION

(71) Applicant: Schlumberger Technology Corporation, Sugar Land, TX (US)

(72) Inventors: Ankur D. Jariwala, Katy, TX (US); Gary W. Sams, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 955 days.

(21) Appl. No.: 17/248,702

(22) Filed: Feb. 3, 2021

(65) Prior Publication Data

US 2021/0246529 A1 Aug. 12, 2021

Related U.S. Application Data

(60) Provisional application No. 62/970,781, filed on Feb. 6, 2020.

(51) Int. Cl.
*C25C 1/00* (2006.01)
*B01D 17/06* (2006.01)
(Continued)

(52) U.S. Cl.
CPC .............. *C22B 26/12* (2013.01); *B01D 17/06* (2013.01); *C01D 15/00* (2013.01); *C02F 9/00* (2013.01);
(Continued)

(58) Field of Classification Search
CPC ..... C22B 6/12; C22B 3/24; C02F 9/00; C02F 1/26; C02F 1/52; C02F 1/461;
(Continued)

(56) References Cited

U.S. PATENT DOCUMENTS

| 4,159,311 A | 6/1979 | Lee et al. |
| 4,291,001 A | 9/1981 | Repsher et al. |
| | (Continued) | |

FOREIGN PATENT DOCUMENTS

| EP | 2486966 A1 | 8/2012 |
| EP | 2773782 A1 | 9/2014 |
| | (Continued) | |

OTHER PUBLICATIONS

Jonathan Lipp, (2017) Lithium Solvent Extraction (LiSXTM) Process Evaluation using Tenova Pulsed Columns (TPC), ISEC 2017—The 21st International Solvent Extraction Conference (7 pages).
(Continued)

*Primary Examiner* — Zulmariam Mendez
(74) *Attorney, Agent, or Firm* — Jeffrey D. Frantz

(57) ABSTRACT

Methods and apparatus for integrated alkali metal extraction are disclosed. Various exchange media are used to separate a chosen alkali metal, usually lithium, from a source stream and render the alkali metal into a product. In some cases, absorption/desorption processes, using solid and/or liquid absorption media, are used to purify a brine stream into a concentrate stream having elevated concentration of the desired alkali metal. Various processes, which may include use of liquid absorbents, electrochemical processing, centrifugation, evaporation, electrical mixing and separation, or combinations thereof, are used to separate the chosen metal from the source, and aqueous streams are recycled among the processes to facilitate the various separations.

10 Claims, 10 Drawing Sheets

(51) Int. Cl.

| | | |
|---|---|---|
| *C01D 15/00* | (2006.01) | |
| *C02F 9/00* | (2023.01) | |
| *C22B 3/24* | (2006.01) | |
| *C22B 26/12* | (2006.01) | |
| *C25C 1/02* | (2006.01) | |
| *C02F 1/26* | (2023.01) | |
| *C02F 1/42* | (2023.01) | |
| *C02F 1/461* | (2023.01) | |
| *C02F 1/469* | (2023.01) | |
| *C02F 1/52* | (2023.01) | |
| *C02F 101/10* | (2006.01) | |
| *C02F 103/00* | (2006.01) | |
| *C02F 103/06* | (2006.01) | |

(52) U.S. Cl.
CPC .................. *C22B 3/24* (2013.01); *C25C 1/02* (2013.01); *C02F 1/26* (2013.01); *C02F 1/42* (2013.01); *C02F 2001/422* (2013.01); *C02F 1/461* (2013.01); *C02F 1/469* (2013.01); *C02F 1/52* (2013.01); *C02F 2001/5218* (2013.01); *C02F 2101/10* (2013.01); *C02F 2103/007* (2013.01); *C02F 2103/06* (2013.01); *C02F 2301/046* (2013.01); *C02F 2303/16* (2013.01)

(58) Field of Classification Search
CPC ............... C02F 1/469; C02F 2301/046; C02F 2303/16; C25C 1/02
See application file for complete search history.

(56) References Cited

U.S. PATENT DOCUMENTS

| | | |
|---|---|---|
| 8,216,473 B2 | 7/2012 | Wohlert |
| 8,679,232 B2 | 3/2014 | Wolf et al. |
| 8,840,792 B2 | 9/2014 | Wohlert |
| 9,068,247 B2 | 6/2015 | Marston et al. |
| 9,751,045 B2 | 9/2017 | Wohlert |
| 9,802,845 B2 | 10/2017 | Thiers |
| 10,214,437 B2 | 2/2019 | Blohm et al. |
| 10,214,438 B2 | 2/2019 | Blohm et al. |
| 10,245,555 B2 | 4/2019 | St. John et al. |
| 10,301,198 B2 | 5/2019 | St. John et al. |
| 10,518,218 B2 | 12/2019 | Wohlert |
| 2014/0301922 A1 | 10/2014 | Harrison |
| 2016/0317967 A1 | 11/2016 | Kotagiri et al. |
| 2017/0349467 A1 | 12/2017 | Blohm et al. |
| 2018/0104649 A1 | 4/2018 | Govindan et al. |
| 2018/0147531 A1 | 5/2018 | Park et al. |
| 2019/0009218 A1 | 1/2019 | Choong et al. |
| 2019/0248667 A1 | 8/2019 | Featherstone et al. |
| 2019/0256368 A1 | 8/2019 | Marston et al. |
| 2020/0386156 A1 | 12/2020 | Kabir et al. |
| 2020/0399735 A1 | 12/2020 | Sams et al. |

FOREIGN PATENT DOCUMENTS

| | | |
|---|---|---|
| WO | 2012107429 A1 | 8/2012 |
| WO | 2013146391 A1 | 10/2013 |
| WO | 2017213992 A2 | 12/2017 |

OTHER PUBLICATIONS

Jonathan Lipp, (2018) Tenova Lithium Recovery Process—Solvay CYANEX 936 inside, LSM18, Las Vegas, Jun. 29, 2018 (17 pages).

Jonathan Lipp, (2019) Tenova Lithium Recovery Technology—One process for any Brine Chemistry, Oct. 10, 2019 (12 pages).

Metercell Electrostatic Precipitators, Performance-Guaranteed Distillate Treaters, 2005 (2 pages).

Alejandro Quilodran, Saving money, time and water: Solvent Extraction of Litium with Cyanex 936P, 11th Lithium Supply & Markets Conference, Santiago, Chile, Jun. 10-12, 2019 (18 pages).

Keyvani, 1988, Operating characteristics of rotating beds, Technical Report, downloaded on Jun. 24, 2021 from https://www.osti.gov/servlets/purl/7279454 (63 pages).

International Search Report and Written Opinion issued in PCT Application PCT/US2021/070120, dated Jun. 8, 2021 (11 pages).

"Electrodialysis", Wikipedia, 1990 (retrieved from the internet on Mar. 24, 2021 at https://en.wikipedia.org/wiki/Electrodialysis), p. 1, para 1: p. 2 para 3 (6 pages).

INTEGRATED LITHIUM EXTRACTION

CROSS-REFERENCE TO RELATED APPLICATIONS

This application claims the benefit of U.S. Provisional Application No. 62/970,781, filed Feb. 6, 2020, which is incorporated by reference in its entirety.

FIELD

This patent application describes methods and apparatus for lithium recovery from aqueous sources. Specifically, integrated lithium extraction processes are described herein.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

Global lithium reserves are, according to one estimate, about 82.8 MMT (million metric tons) LCE (lithium carbonate equivalents), with China, Argentina, and Chile accounting for some 80% of known global reserves. Current global demand is estimated at 212 kMT, a rate that current global reserves can supply for about 390 years. While global demand has approximately tripled over the last decade, demand for lithium is expected to increase approximately five-fold over the coming decade, with annual increases exceeding 20%. Extraction capacity is currently approximately in balance with demand, and planned investments are estimated to grow extraction capacity to 735 kMT LCE by 2022. With more money being deployed in lithium extraction, new cost-effective technologies are needed to drive growth in use of renewable energy.

The mining industry has numerous techniques for the extraction of lithium from mineral or saline waters. Hard rock mining with acid digestion is common, but labor intensive. Methods currently used for salar lakes involve evaporation ponds with chemical additives to selectively precipitate the lithium. This process requires months to complete yielding a material containing roughly 50-60% lithium.

In recent years, companies are investigating improved methods to recover lithium directly from salar lakes that avoid evaporation, are faster with high lithium yield. Many techniques use a solid adsorbent that selectively recovers lithium, followed by a wash step that liberates the lithium for further processing. These techniques require a large quantity of vessels and associated piping to leverage the economy of scale.

Other techniques use a liquid absorbent that selectively recovers the lithium followed by a wash step. The adsorbent efficacy can be increased through pre-conditioning of the input salar waters and post-processing on the lithium product. The absorbent is contacted with a lithium-bearing brine in a pulse column. The absorbent and brine counter-flow through the column, and hydraulic pulses are applied to shear the fluids into small domains that intimately contact to extract lithium from the aqueous phase into the absorbent. Lithium is then separated from the absorbent using acid to form an aqueous lithium salt solution or slurry, which can then be processed to yield lithium in a desired form.

Pre-conditioning steps generally include the removal of divalent ions, specifically calcium and magnesium, which will be co-absorbed by either a solid or liquid extraction step, generally referred to as "softening." This softening step can be accomplished using one of two techniques. One softening method involves adding basic materials such as sodium carbonate and sodium hydroxide to the water to crystallize and precipitate calcium carbonate and magnesium hydroxide to "soften" the water.

The methods above are generally difficult to scale, are expensive to operate, and are generally not efficient and environmentally benign in use of water. New apparatus and methods of lithium extraction are needed.

SUMMARY

Embodiments described herein provide a method of recovering alkali metals from an aqueous source, comprising removing divalent ions from the aqueous source by exposing the aqueous source to an intercalated resin that absorbs alkali metals; flushing the intercalated resin using a clean water stream to produce an aqueous divalent depleted stream; extracting alkali metals from the aqueous divalent depleted stream to produce a concentrated monovalent stream and a monovalent depleted stream; and routing the monovalent depleted stream to a purification process to produce the clean water stream.

Other embodiments described herein provide a method of recovering lithium from an aqueous source, comprising using a solid adsorbent selective for lithium in a first process to form an aqueous divalent depleted stream from the aqueous source; using a liquid absorbent in a second process to form an aqueous lithium rich stream from the aqueous divalent depleted stream; and recovering lithium from the aqueous lithium rich stream in a third process.

Other embodiments described herein provide a lithium extraction apparatus, comprising a first absorption/desorption unit comprising a solid absorbent, a first aqueous recycle inlet, and an outlet; a second absorption/desorption unit comprising a liquid absorbent and having an inlet coupled to the outlet of the first absorption/desorption unit, an intermediate product outlet, and a first aqueous recycle outlet fluidly coupled to the first aqueous recycle inlet of the first absorption/desorption unit, and a second aqueous recycle inlet; and a recovery unit with an inlet coupled to the outlet of the second absorption/desorption unit and a second aqueous recycle outlet fluidly coupled to the second aqueous recycle inlet.

DETAILED DESCRIPTION

Figure 1A:
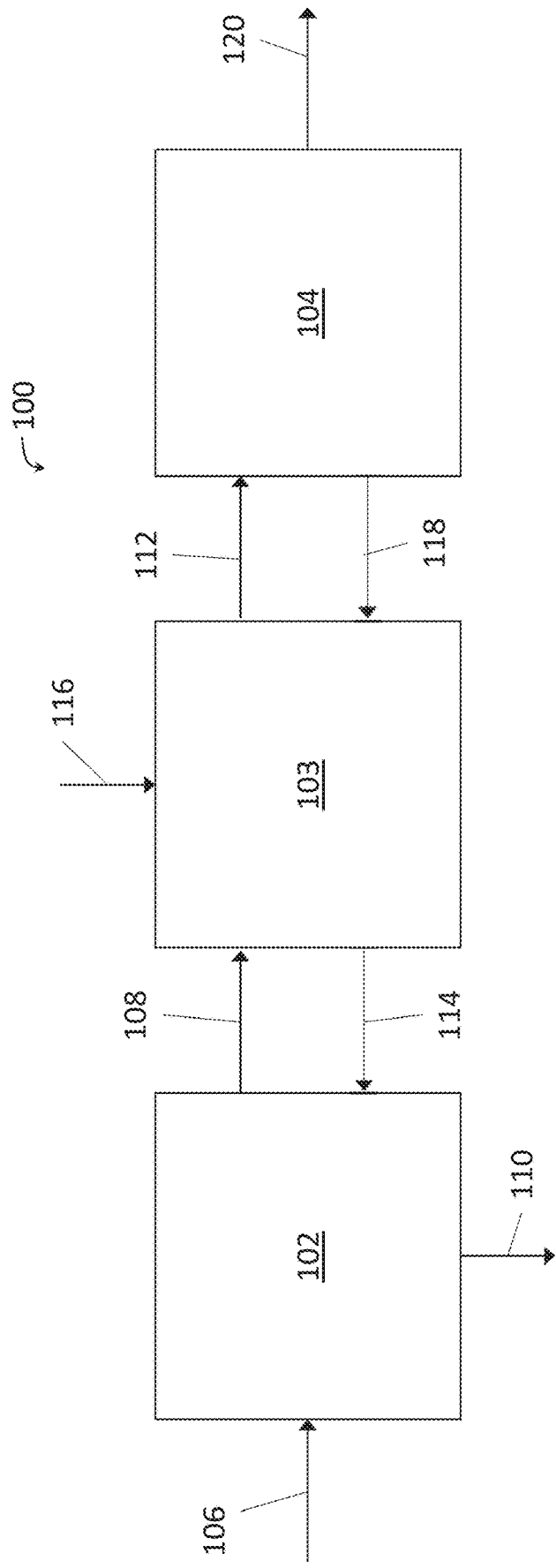
FIG. 1A is a process diagram summarizing a lithium recovery process according to one embodiment.

FIG. 1A is a process diagram summarizing a lithium recovery process 100 according to one embodiment. The process 100 generally has three stages or sub-processes, a first process 102 that can be a preparation stage, a second process 103 that can be an extraction stage, and a third process 104 that can be a finishing stage. Each process generally has a feed stream and an effluent stream, and aqueous streams, which might be just water, generally recycle among the processes.

In the first process 102, a brine stream 106 bearing lithium is subjected to one or more treatments to reduce impurity concentration and, optionally to increase lithium concentration. Divalent ions and non-lithium monovalent ions are separated from lithium to yield a first effluent 108 with very low, or even undetectable amounts of non-lithium monovalent and divalent ions. Returnable water 110 is rejected in the first process 102 and can be returned to the environment, either to the source, for example the salar lake source, mine source, or seawater source, or to a rapid infiltration basin, or other reinjection facility, for subterranean reinsertion. The returnable water 110 generally contains the divalent and non-lithium materials from the source brine that were separated from lithium in the first process.

Returnable water can also be returned to the source in a way that promotes extraction. For example, where the source is a salar lake, water can be returned at a location in the lake that energizes gradual flow of lithium bearing water toward the feed location for the process 100. Likewise, for subterranean sources, a reinjection location can be selected that has a similar effect of flowing lithium-bearing water toward the process feed location.

The first process effluent 108 is routed to the second process 103 by a conduit fluidly coupled to an outlet of the first process and to an inlet of the second process. In the second process 103, the first process effluent 108 is subjected to physical and/or chemical treatment to extract or concentrate lithium to form a lithium concentrate stream 112 as effluent from the second process 103. Water, or an aqueous stream, is generally recovered in the second process 103 and recycled to the first process 102 as an aqueous recycle 114. The recycle 114 is generally useable, potentially blended with fresh water or subjected to a purification process, in the absorption/desorption processes of the first process 102 to form the first process effluent 108. Some processes that can be used in the second process 103 use one or more processing aids 116 as input to the second process 103. The processing aids 116 generally facilitate the physical and/or chemical treatments of the second process 103.

The lithium concentrate stream 112 may be an ionic solution of lithium or an aqueous slurry of one or more lithium salts. The third process 104 generally recovers the lithium into a transportable or saleable lithium product stream 120, usually a concentrated lithium hydroxide aqueous solution or slurry or a concentrated lithium chloride, carbonate, or sulfate aqueous solution or slurry. Extraction aids and/or water streams may be recycled from the third process 104 in one or more recycle streams 118. In some cases the one or more recycle streams 118 includes an aqueous recycle stream that is a lithium salt solution to aid in separation of lithium streams in the second process 103. In some cases, one (or more) of the recycle streams 118 can be an acid stream, which may contain lithium. Multiple recycle streams 118, for example an acid stream and a salt stream, may be routed from the third process 104 to different parts of the second process 103.

The lithium extraction process 100 efficiently removes lithium from a brine stream and returns the lithium-depleted brine stream to the environment harmlessly. Brine streams can be obtained from salar lakes, mining operations, geothermal sources, surface brines, seawater, petro-lithium brine, and other aqueous lithium sources. Lithium minerals can also be dispersed in water for processing in the lithium extraction process 100. The product lithium stream 120 is suitable for crystallization and evaporation processes to recover solid lithium compounds from the concentrated lithium-containing product stream 120.

Figure 1B:
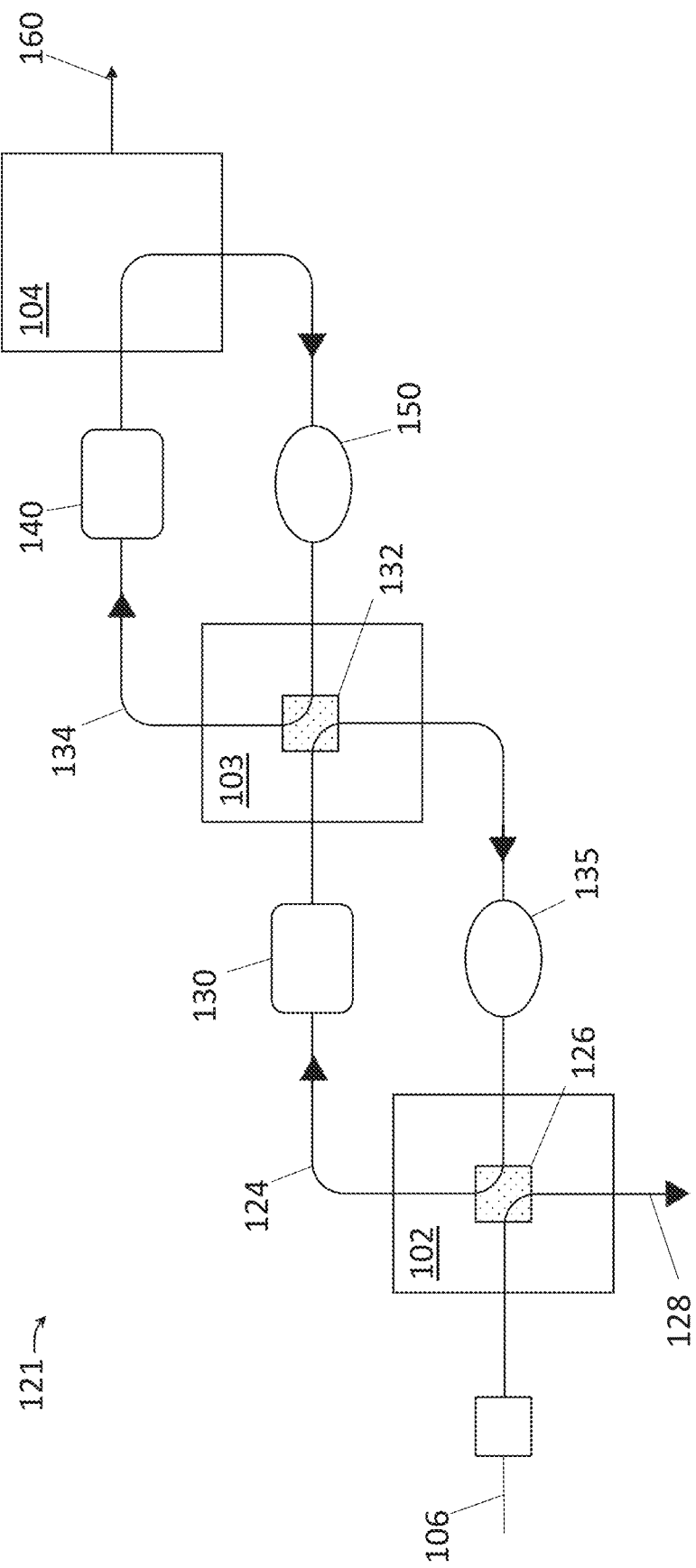
FIG. 1B is a schematic process diagram of a lithium recovery process according to another embodiment.

FIG. 1B is a schematic process diagram of a lithium recovery process 121 according to another embodiment. The process 121 uses a stagewise exchange process supported by circulating aqueous, or water, loops. The first process 102 accomplishes an exchange between a source stream 106 and a first aqueous loop 124. A first exchange medium 126 is used in the first process 102 to accomplish the exchange. Here, since the process 121 is a lithium recovery process, lithium is exchanged between the source stream 106 and the first aqueous loop 124. In one case, the first exchange medium 126 selectively absorbs lithium from the source stream 106 and lithium is released from the first exchange medium 126 by the aqueous loop 124. In this case, first exchange medium 126 is sequentially exposed to the source stream 106 and the aqueous loop 124, and the first exchange medium 126 may contain multiple units to allow continuous flow of the source stream 106 and the first aqueous loop 124. The first exchange medium 126 generally separates lithium from other materials, such as divalent materials and non-lithium monovalent materials, in the source stream 106. The separated materials exit in a rejected aqueous stream 128.

A portion of the first aqueous loop 124 carries lithium from the first process 102 to the second process 103. A volume of the first aqueous loop 124 is selected to provide a target concentration of lithium to the second process 103, which may be higher or lower than a concentration of lithium in the source stream 106. In one category of embodiments, the target concentration of lithium delivered to the second process 103 is higher than the concentration of lithium in the source stream 106. The first aqueous loop 124 may be passed through a filter process 130 before flowing to the second process 103. The filter process 130 may further purify the aqueous stream flowing in the first aqueous loop 124 from the first process 102 to the second process 103, removing solids and/or impurities, for example scavenging any residual non-lithium divalent or monovalent species in the first aqueous loop 124.

The second process 103 may be a process for providing lithium in an arbitrary form at an arbitrary concentration. Generally, after separation of lithium from the source stream 106, the second process 103 prepares lithium for finishing into a salable form in the third process 104. A second exchange medium 132 is used to exchange lithium from the first aqueous loop 124 to a second aqueous loop 134. As in the process 102, the exchange medium 132 selectively absorbs lithium from the first aqueous loop 124, and lithium is released from the second exchange medium 132 by contact with the second aqueous loop 134. As in the process 102, the second exchange medium 132 is sequentially contacted with the first and second aqueous loops 124 and 134.

It should be noted that the first and second exchange media 126 and 132 may each be solid or liquid. The first exchange medium 126 need only be selective for lithium, and may be solid or liquid. Likewise, the second exchange medium 132 need only be selective for lithium, and may be solid or liquid. Solid lithium-selective exchange media are noted above. Where the exchange medium is a solid, multiple units can be used to allow continuous operation, where one or more units are in absorption mode while one or more other units are in desorption mode. Where the exchange medium is a liquid, the liquid exchange medium can be continuously circulated between loading phases and unloading phases.

After releasing lithium, the first aqueous loop 124 returns to the first process 102. The first aqueous loop 124 may be subjected to a purification process 135, such as a reverse osmosis process, other membrane filtration process, or other filtration process to remove any residual impurities, such as divalent species or non-lithium monovalent species. In this way, the first aqueous loop 124 circulates between the first and second processes 102 and 103, acting as a carrier for lithium. If necessary, the first aqueous loop 124 may be water balanced by adding or removing water as necessary. A tank with level control and water makeup (not shown) can be provided in the first aqueous loop 124 for this purpose.

The second aqueous loop 134 carries lithium from the second process 103 to the third process 104 where lithium is removed from the second aqueous loop 134 and converted to a salable product 160. The third process 104 can be an electrolysis process, an evaporation process, an electrochemical process, or any suitable process for converting lithium to a salable form. The second aqueous loop 134 allows lithium to be provided to the third process 104 at a concentration that allows optimum processing in the third process 104. For example, many processes for converting lithium to a salable form benefit from a feed stream having an arbitrarily high concentration of lithium. Using the second aqueous loop 134 allows lithium concentration in the feed to the third process 104 to be optimized by selecting a circulation volume of the second aqueous loop 134.

As with the first aqueous loop 124, the second aqueous loop 134 may be subjected to a filtration process 140 before the third process 104, and after releasing lithium in the third process 104, the second aqueous loop 134 returns to the second process 103. As with the first aqueous loop 124, the second aqueous loop 134 may be subjected to a purification process 150, which as above may be a reverse osmosis process, another membrane process, or another filtration process, to remove any impurities.

In a typical implementation of the process 121, the source stream 106 may be a brine with 200 ppm lithium, and the first process 102 can be operated to provide a lithium concentration in the first aqueous loop 124 exiting the first process 102 of 1500 ppm by setting a flow volume of the first aqueous loop at about 10-15%, for example 13%, of the flow volume of the source stream 106. The second process 103 can be operated to provide a lithium concentration in the second aqueous loop 134 exiting the second process 103 of 3000 ppm by setting a flow volume of the second aqueous loop at about 50% of the flow volume of the first aqueous loop 124.

Operation of the first and second processes 102 and 103 for exchanging lithium may benefit from recycling a low concentration of lithium in the first and second aqueous loops 124 and 134. For example, a concentration of lithium around 100 ppm in each stream may be helpful in releasing lithium from the first and second exchange medium 126 and 132, in some cases. Thus, either of the first or the second aqueous loops 124 and 134 may be operated with a residual amount of lithium being recycled to aid lithium extraction.

Figure 2A:
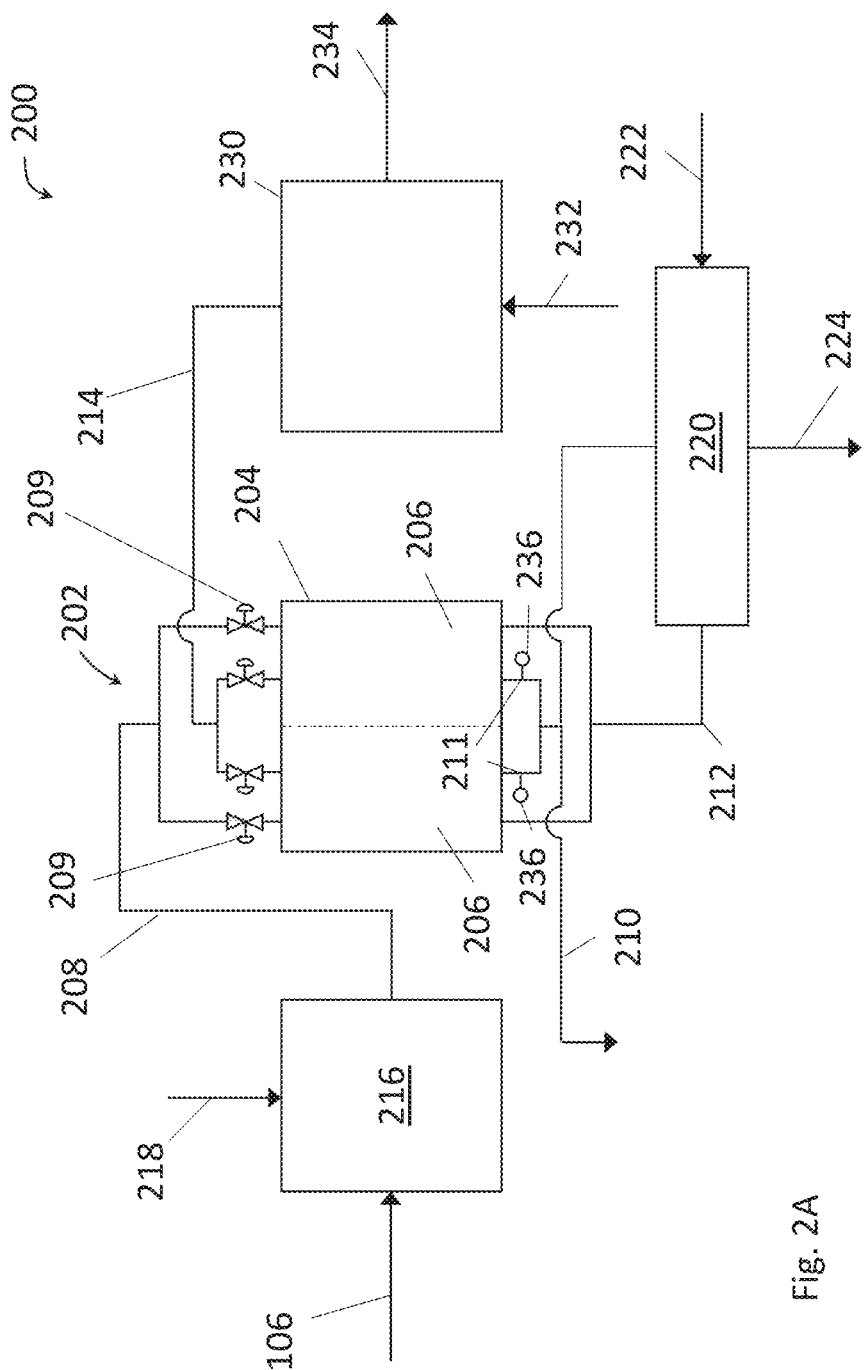
FIG. 2A is a process diagram of a separation process for a lithium extraction process, according to one embodiment.

FIG. 2A is a process diagram of a separation process 200 for a lithium extraction process, according to one embodiment. The separation process 200 can be used as the first process 102 of the lithium extraction process 100 of FIG. 1. The separation process 200 includes an absorption/desorption resin unit 202 configured to contact a lithium-bearing brine stream with an absorption resin selective to lithium, examples of which include DOWEX AG® 50W-X12, an ion exchange resin available from Dow Chemical Co. of Midland, Mich., and AMBERSEP™ G26 H resin available from Dupont de Nemours, Inc., of Wilmington, Del. Other aluminum hydroxide based resins can also be used. The separation process 200 separates lithium from other non-lithium species, at least in part, to facilitate lithium recovery from a lithium source. The non-lithium species separated from lithium in the separation process 200 include divalent species, such as calcium and magnesium, and monovalent non-lithium species, such as sodium.

The absorption/desorption resin unit 202 comprises a vessel 204, in which one or more resin beds 206 is disposed. The resin beds 206 may comprise a resin support material, such as polystyrene or polypropylene, and an absorption material, potentially with solid diluent to control flow velocity through the resin bed. Brine is charged to a resin bed 206 through feed line 208. The brine stream passes through the resin bed 206 and lithium ions from the brine stream adhere to the resin in the resin bed 206. Lithium adsorbs onto the surface of resin fibers or particles in the resin bed 206, so the resin is an adsorption resin. The resin bed 206 thus absorbs lithium from the brine, so the resin is also an absorption material. In this case, the feed line 208 is divided into branches to feed the two resin beds 206. Control valves 209 may be used to control flow of brine to one resin bed 206 or the other. Lithium-depleted brine exits the resin beds 206 through a return effluent line 210, shown here branched for the two resin beds 206.

When the resin bed 206 reaches an endpoint, for example a saturation point of lithium ions in the resin bed 206, flow of the brine stream through the resin bed 206 is discontinued, and in this case switched to the other resin bed 206. The resin bed 206 that has reached its end point is flushed with water to remove the lithium from the resin. Flush water enters the resin bed lithium-free, or with a low concentration of lithium, through a flush water line 212, branched here for the two resin beds 206. Lithium is released from the resin bed into the fresh water, which exits the resin bed through a lithium-bearing effluent line 214. The flush water is typically flowed through the resin bed 206 in a direction opposite to a flow direction of the brine stream through the resin bed 206. Concentration of lithium ions in the lithium-bearing effluent can be maximized by minimizing flow of water through the resin bed 206. Time and concentration can be optimized for a given resin bed, but the optimal flow of water generally depends on size and porosity of the resin bed 206, and on loading of the resin bed 206. Lower flow rate results in higher lithium concentration. In general, concentration of lithium ions in an optimized flush water flow will be from about 2 ppm to about 200 ppm. In one example, using a resin bed with a volume of about 400-500 ft$^3$, a flow of about 15 gpm of fresh water for about 100 minutes removes most lithium from the resin bed, resulting in an effluent lithium concentration of about 1,800 ppm.

Prior to entering the resin bed 206 for lithium removal, a brine stream may be subjected to a pretreatment in a preparation unit 216. The preparation unit 216 may be, or include, a filtration unit to remove any solids that might reduce effectiveness of the resin bed, or beds, at removing lithium. The preparation unit 216 may be, or include, a pH adjustment unit that lowers pH of the brine stream 106 to passivate silica in the brine stream 106. A pH of 4-7 is found to be helpful in reducing, or eliminating, the effect of silica on absorption/desorption processes. The brine stream 106 is treated in the preparation unit 216 to yield the brine feed routed to the absorption/desorption unit 202 through the brine feed line 208. Sand, and other solids, can be removed in the preparation unit 216 using a suitable filtration method, such as microfiltration, ultrafiltration, or another filtration method. Filtration processing aids 218, such as ferric chloride or other processing aids such as pH adjustment aids (for example hydrochloric acid), may be added to the preparation unit 216. Typically, for processing in resin beds, it is helpful to remove all solid particles of size 10 μm and above. Multiple stages of filtration can be used, if desired, so that flow rate can be optimized. For example, a first stage of rough filtration can remove large particles and a second stage of fine filtration can remove smaller particles, and the capacity of both stages can be adjusted to optimize throughput.

Lithium-depleted brine from the absorption/desorption resin beds is removed through return effluent line 210, and can be processed for return to the environment. A lithium-depleted effluent line 211 carries lithium-depleted effluent from each resin bed 206 to the return effluent line 210. Any impurities that might recycle from further downstream in the process can be removed using suitable chemical treatments. Alternately, and/or additionally, the brine can be routed to a rapid infiltration bed for leaching back into the ground.

Flush water for flushing the resin beds 206 can be obtained from any convenient source. Here, the flush water is reclaimed from other parts of the process using a reverse osmosis unit 220, which returns purified water through the flush water line 212 to the absorption/desorption resin unit 202. The reverse osmosis unit 220 can be an advanced reverse osmosis unit with sweep. Water can be reclaimed from the return effluent line 210 or by recycling water from downstream processes, such as the second and third processes 103 and 104 (FIG. 1), in a recycle water stream 222. Both water sources can be routed to the reverse osmosis unit 220 according to process conditions. The reverse osmosis unit 220 returns a concentrated return brine stream 224 to the environment, for example to a rapid infiltration bed. As noted above in connection with FIG. 1B, to the extent water flow in return brine stream 224, or other reject streams, is more than water input from the source 106, make-up water can be provided at any convenient location of the process. For example, the flush water 212 can be stored in a tank with level control operationally coupled to a make-up water stream.

The lithium-bearing water effluent from the resin bed or beds may contain residual monovalent and divalent ion impurities. Removing, or reducing, these impurities can be helpful to some downstream lithium extraction operations. The impurities may include other alkali metals such as sodium and potassium and alkaline earths such as magnesium and calcium. In FIG. 2A, a softener 230 is used to treat these impurities. The lithium-bearing effluent line 214 carries lithium-bearing effluent to the softener 230 where softening reagents are added in a reagent stream 232. The softener 230 typically uses a vessel and may include mixing. Alternately, the softener 230 may be an ion exchange resin unit with resins, such as chloralkali ion exchange resins available from Dow Chemical Co. of Midland, Mich., that are selective to divalent ions. A softener effluent 234 is withdrawn from the softener 230 and sent to further processing such as lithium extraction.

The separation process 200 is generally operated to concentrate lithium and reduce the concentration of impurities such as monovalent and divalent ions other than lithium because reducing the volume of water to be handled reduced the size of equipment needed to further process the lithium. Lithium sensors can be used at various places in the process 200 to monitor operation, and operating conditions of the absorption/desorption resin unit 202 can be adjusted to affect lithium concentration in the effluent. For example, a lithium sensor 236, such as a lithium-selective electrode, can be coupled to the lithium-depleted effluent lines 211 of the individual resin beds 206 to detect lithium increase in the lithium-depleted effluent as a sign of approaching endpoint of the resin bed 206. Lithium sensors can also be coupled to the lithium bearing effluent line 214 and/or the brine feed line 208 to provide lithium concentration information for use in process control. The lithium sensor 236 may be an online analytical sensor, such as a capillary electrophoresis sensor, to sense multiple ions. Such lithium detectors can also be used prior to approach of the endpoint to optimize brine throughput through the resin bed 206. For example, brine flowrate through a resin bed 206 can be increased until a rise in lithium concentration in the lithium-depleted effluent line 211 is detected. A tolerance threshold can be applied to define a maximum flowrate through the resin bed 206.

Figure 2B:
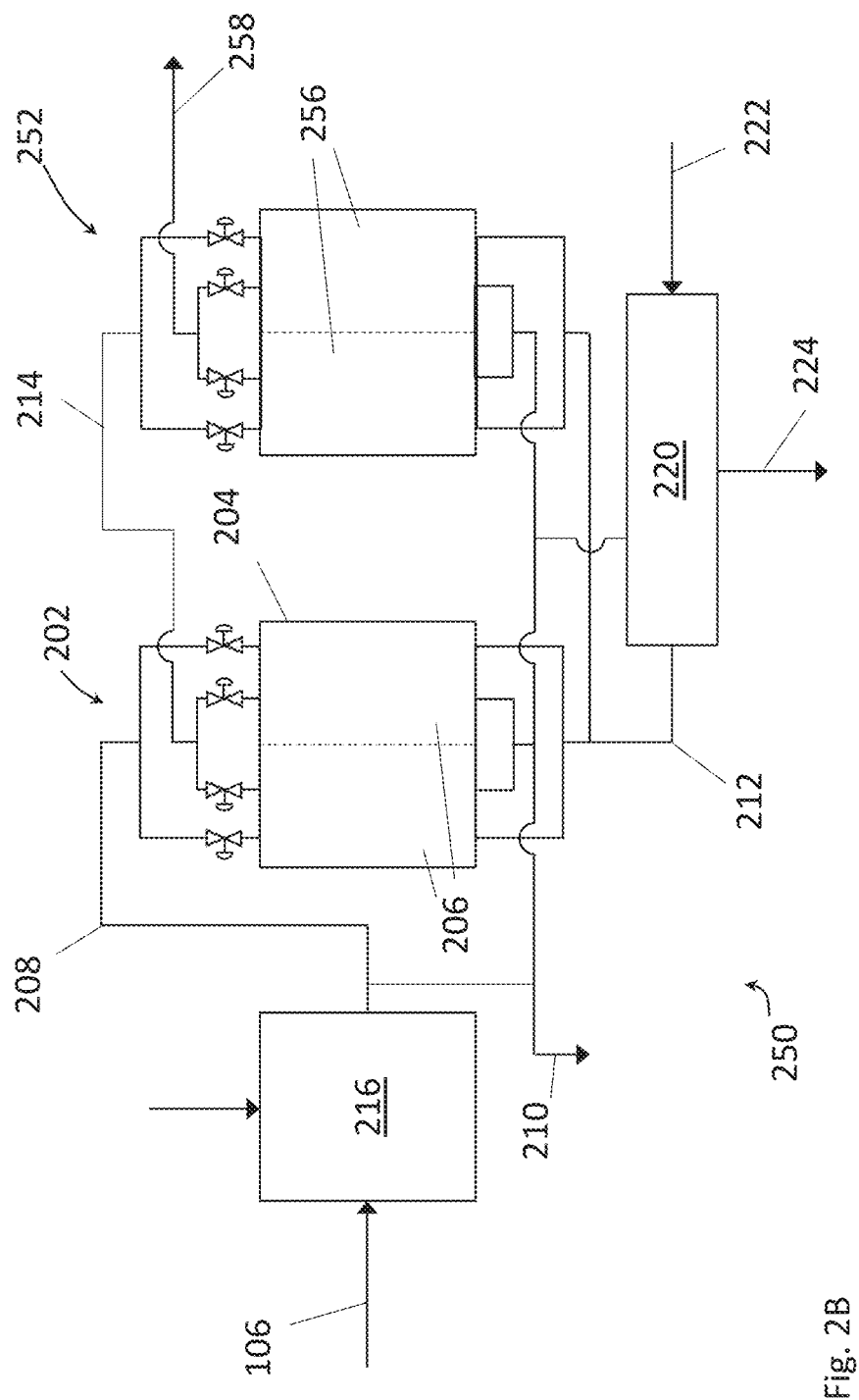
FIG. 2B is a process diagram of a separation process according to another embodiment.

FIG. 2B is a process diagram of a separation process 250 according to another embodiment. In this embodiment, a second stage of absorption/desorption takes the place of the softener 230. Here, the absorption/desorption resin unit 202 is a first absorption/desorption resin unit, and the separation process 250 includes a second absorption/desorption resin unit 252. The lithium-bearing effluent line 214 is routed to the second absorption/desorption resin unit 252 for a second process of lithium concentration and purification similar to that performed in the first absorption/desorption resin unit 202.

Here the lithium-bearing stream charged to the second resin unit 252 can have any lithium concentration. For example, the lithium-bearing effluent of the first resin unit 202 has an elevated lithium concentration compared to the initial brine stream charged to the first resin unit 202 through the feed line 208. In one case, the lithium-bearing effluent of the first resin unit 202 may be operated at maximum lithium concentration by minimizing flush water to the resin beds 206 to a practical minimum. Alternately, the lithium-bearing effluent of the first resin unit 202 may be operated at a lithium concentration somewhat reduced from the practical maximum, for example by 20-40%, to provide a process operating window. In general, higher TDS (total dissolved solids) in the brine feed to the resin bed 206 enhances adsorption by the resin bed 206, leading to better separation.

The second absorption/desorption resin unit 252 may use different exchange materials, different resins, or different morphologies than the first absorption/desorption resin unit 202. The second resin unit 252 has, in this case, two resin beds 256, each of which contains an exchange material selective to lithium. As noted elsewhere, more than two resin beds 256 can be used to optimize bed use for continuous operation. Because the lithium-bearing stream charged to the second resin unit 252 may have different composition from the brine fed to the first resin unit 202 through the feed line 208, the resin in the beds 256 may have a different configuration from the resin in the beds 206 and/or a different loading of exchange material. If, for example, the stream fed to the second resin unit 252 has higher lithium concentration, lower impurity concentration, and lower flow rate than the stream fed to the first resin unit 202, the resin beds 256 may be larger than the resin beds 206 to accommodate adsorbing more lithium, or may include more exchange material and/or have higher surface area to adsorb more lithium.

The second absorption/desorption resin unit 252 is operated in a manner similar to the first absorption/desorption resin unit 202, with lithium-bearing feed from the lithium-bearing effluent line 214 routed to one of the resin beds 256 of the second resin unit 252. The fluid from the lithium-bearing effluent line 214 flows through the resin bed 256 depositing lithium in the exchange resin of the resin bed 256. Upon reaching an endpoint, which may be at saturation of the resin bed 256 with lithium, flow of the lithium-bearing stream through the resin bed 256 is discontinued and flush water is flowed through the resin bed 256 to remove the lithium from the resin bed 256. Flow rate of flush water can be selected to increase lithium concentration further, if desired.

Flush water for the second absorption/desorption resin unit 252 can be obtained from any source. Here, the flush water is obtained from the reverse osmosis unit 220, as for the first absorption/desorption resin unit 202. It should be noted that other forms of purification can be used instead of reverse osmosis, such as other membrane purification processes and/or other filtration processes. The reverse osmosis unit 220 is, in this case, sized to provide sufficient flush water for operation of the two resin units 202 and 252. Flush water flow can be split between the two units 202 and 252 using appropriate valving, which is omitted from FIG. 2B for simplicity. Lithium-depleted water from the second resin unit 252 can also be routed to the reverse osmosis unit 220 for water recovery and recycle, and/or mixed with the brine feed 208.

In the process 250 of FIG. 2B, the second absorption/desorption resin unit 252 produces a lithium-bearing effluent 258 that is typically higher in lithium concentration than the lithium-bearing effluent stream from the first resin unit 202. In one example, the feed stream 208 has 500 ppm lithium, the lithium-bearing effluent stream in the lithium-bearing effluent line 214 has 1,500 ppm lithium, and the lithium-bearing effluent stream in the second lithium-bearing effluent line 258 has 3,000 ppm lithium. In some cases, the concentration of lithium in the second lithium-bearing effluent line 258 may be sufficient so that further concentration and extraction is unnecessary. In such cases, the second resin unit 252 may function in the role of the second process 103 of the general process 100 of FIG. 1. In such cases, the lithium-bearing effluent line 258 may route lithium-bearing water directly to the third process 104, or to other uses as an intermediate or finished product.

Figure 2C:
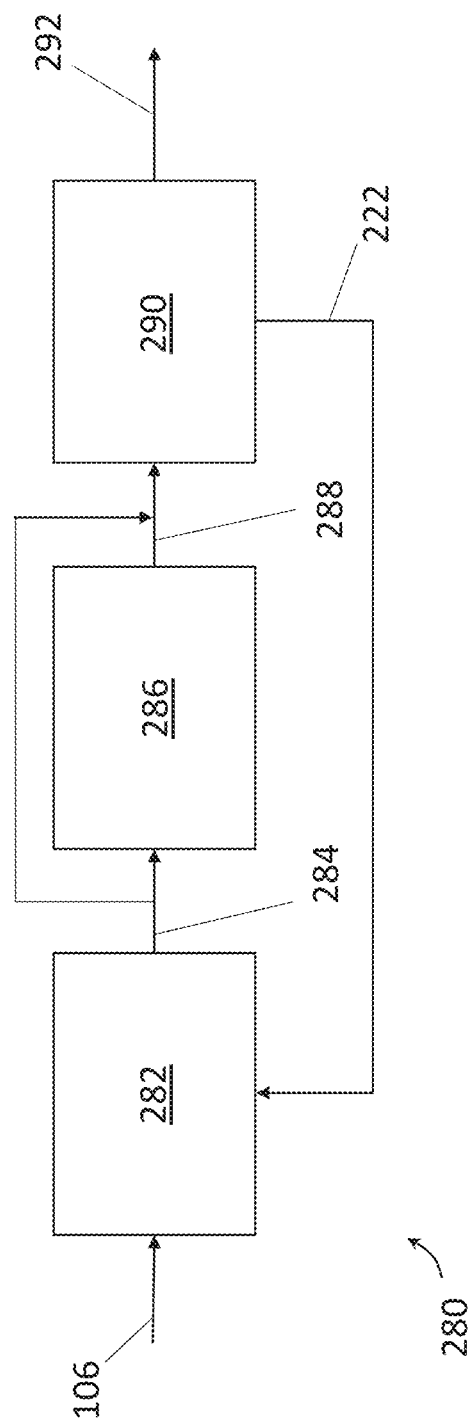
FIG. 2C is a process diagram of a first process according to another embodiment.

FIG. 2C is a process diagram of a first process 280 according to another embodiment. Here, an exchange section 282 is used to initialize a purified lithium-bearing stream 284 from the brine feed 106, using single, double, or multi-stage absorption/desorption processing. The lithium-bearing stream 284 is optionally routed to a softener 286, where an intermediate lithium-bearing stream 288 emerges. Either the lithium-bearing stream 284 or the intermediate lithium-bearing stream 288 is routed to an evaporator 290 to increase lithium concentration. Much of the water in the feed to the evaporator 290 can be removed and returned to the exchange section 282 as the recycle water stream 222. A lithium concentrate stream 292 emerges from the evaporator having lithium concentration up to the solubility limit of the lithium salts from the original brine feed 106. For lithium chloride, the concentration in the lithium concentrate stream 292 may be up to 84 wt %. Any suitable evaporator can be used for the evaporator 290, including steam evaporators, furnace evaporators, solar-powered or direct solar evaporators, and the like. In one embodiment, a multi-effect compression evaporator is used in which the lithium-bearing feed stream is exposed to a heat source at elevated pressure to increase temperature, and then the heated stream is reduced in pressure to effect evaporation and separation of vapor from residual liquid, which becomes the lithium concentrate stream 292.

Figure 3A:
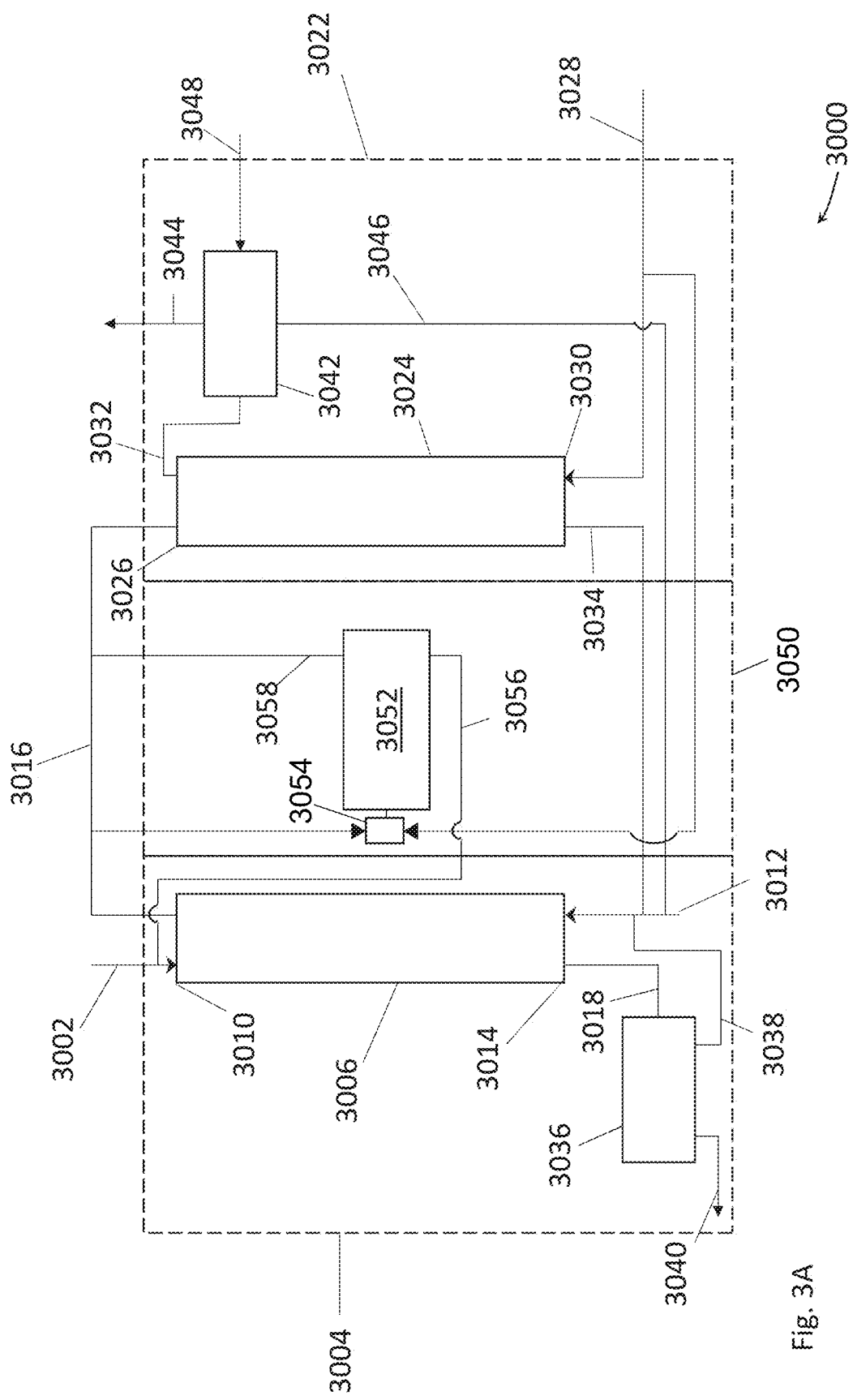
FIG. 3A is a process diagram of a lithium extraction process according to one embodiment.

FIG. 3A is a process diagram of a lithium extraction process 3000 according to one embodiment. The lithium extraction process 3000 may be used as the second process 103 of the lithium extraction process 100 of FIG. 1. The lithium extraction process 3000 may also, or alternately, be used at the first process 102 of the lithium extraction process 100 of FIG. 1. The lithium extraction process 3000 removes lithium from an aqueous source, and produces an environmentally benign aqueous return stream. Here, the aqueous source is a process such as the first process 102 of the lithium extraction process 100 of FIG. 1.

The lithium extraction process 3000 is a liquid absorption process. A lithium-bearing stream 3002 is contacted with a liquid absorbent that is not miscible with water to extract lithium from the water. The lithium-bearing stream 3002 may be the high-concentration lithium-bearing streams of the lithium-bearing effluent line 214 of FIG. 2A, the softener effluent 234, the lithium-bearing stream of the second lithium-bearing effluent line 258, or the lithium concentrate stream 292, among others. Use of high-concentration lithium streams generally allows for reduction in size of equipment. The liquid absorbent most commonly used is CYANEX 936®, available from Solvay S.A. of Brussels, Belgium. The absorption process is performed in a contacting section 3004, where intimate contact of the lithium-bearing stream 3002 with the absorbent is performed. A contactor 3006 provides the intimate, high surface area contact that is most useful for solvent extraction of lithium from aqueous media. The lithium-bearing stream 3002 is provided to a first end 3010 of the contactor 3006 while a liquid absorbent stream 3012 containing the lithium absorbent is provided to a second end 3014 of the contactor 3006, thus performing a counter-current liquid-liquid extraction. A loaded absorbent stream 3016 is removed at the first end 3010 of the contactor 3006 while a lithium-depleted aqueous stream 3018 is removed at the second end 3014 of the contactor 3006. The loaded absorbent stream 3016 is mainly the liquid absorbent complexed with lithium ions, and potentially other monovalent and divalent impurities. The contactor 3006 is a high shear vessel that shears the absorbent phase into very small domains that intimately contact the aqueous phase to provide high surface area for interfacial transport of lithium from the aqueous phase to the absorbent. Alternately, the high shear vessel can shear the aqueous phase into small domains dispersed in the absorbent phase.

In one embodiment, the contactor 3006 is a pulse column that comprises a plurality of parallel trays disposed throughout the column at regular intervals. A hydraulic or mechanical impulse source is fluidly coupled to the column interior to provide an impulse to the fluid flowing through the column. Alternately, the trays can be moved abruptly to establish shear. Differences in density of the aqueous and non-aqueous phases result in different effect of the hydraulic pulse on the two phases, giving rise to very high instantaneous shear rates as the pulse propagates through the fluid column. The shear maintains very small domains of the absorbent phase in the aqueous phase. The pulse column is a technology available from Tenova S.p.A. of Gerenzano, Italy, and other providers.

Caustic can be injected at one or more locations of the contactor 3006, or into the lithium-bearing stream 3002, to manage pH in the contactor 3006 as metal transfers from the aqueous to the organic phase. The caustic species may be selected to have low affinity for the organic adsorbent to avoid adding substantial impurities to the metal absorbed by the organic absorbent. Rate of caustic addition may be adjusted to maintain a desired pH at any selected location of the contactor 3006, at which point a pH sensor may be coupled to the contactor 3006.

Lithium is extracted from the loaded absorbent stream 3016 in an extraction section 3022. The loaded absorbent stream 3016 is contacted with an aqueous decoupling agent in an extractor 3024. The aqueous decoupling agent breaks the lithium-absorbent complex and produces an aqueous lithium salt solution or slurry. The aqueous decoupling agent is typically a strong acid solution such as sulfuric acid. In this case, the extractor 3024 is a stripping column in which the loaded absorbent stream 3016 is provided to a first end 3026 of the column and sulfuric acid is provided as an aqueous decoupling agent 3028 to a second end 3030 of the column opposite from the first end 3026. The sulfuric acid and loaded absorbent flow in counter-current through the column, and where the aqueous and organic phases contact, sulfuric acid reacts with the lithium-absorbent complex to produce lithium sulfate in the aqueous phase flowing from the second end 3030 to the first end 3026 as a solution and/or slurry. An aqueous lithium salt stream 3032, which is a stream resulting from decoupling lithium from a lithium containing absorbent stream using an aqueous decoupling agent, is withdrawn from the first end 3026 of the extractor 3024. In this case, the aqueous lithium salt stream is a lithium sulfate stream because sulfuric acid is used as decoupling agent. An unloaded absorbent stream 3034 is withdrawn at the second end 3030 of the extractor 3024. The unloaded absorbent stream 3034 can be recycled to the contactor 3006 as the absorbent stream 3012 after appropriate purification. The extractor 3024, in this case, is a column, but other types of contacting apparatus, such as various types of mixed vessels and electrical settlers such as dual frequency A/C or D/C settlers, can be used also.

Separation processes can optionally be used in the contacting stage and the extraction stage to mitigate any carryover or carryunder material which would otherwise result in loss of lithium or loss of absorbent. For example, the lithium-depleted aqueous stream 3018 can be routed to a first separator 3036 to recover any trace absorbent eluted from the contactor 3006. The separator may be any convenient physical or chemical separator including settlers, which may be electrically, chemically, or buoyantly enhanced (buoyant enhancement can be performed by flowing gas through a settling fluid to enhance separation velocity), rotational separators, strippers, scrubbers, or combinations thereof. The separator 3036 can also be the reverse osmosis unit 220 of FIGS. 2A and 2B or another reverse osmosis unit. The separator 3036 yields a recovered absorbent in a recovered absorbent line 3038 connected with the liquid absorbent stream 3012. The separator 3036 also yields a recovered aqueous stream 3040 that can be routed to the reverse osmosis unit 220, or if the separator 3036 achieves sufficient purification, the recovered aqueous stream 3040 can be returned to the flush water line 212 for use in the absorption/desorption resin units 202 and 252.

The aqueous lithium salt stream 3032 can also optionally be routed to a second separator 3042, which may be any of the kinds of separators described above for the first separator 3036. The optional second separator 3042 yields a clean lithium salt stream 3044 and a recovered absorbent stream, which may be routed through a recovered absorbent line 3046 to the liquid absorbent stream 3012 and/or the unloaded absorbent stream 3034.

A processing aid source 3048 may be used with the separator 3042 to aid in separation of the aqueous stream from the organic stream, thus reducing the amount of impurities in each of the clean lithium salt stream and the recovered absorbent stream. The processing aid source 3048 is, or includes, an alkali metal salt in an aqueous stream such as a solution or slurry. The alkali metal is usually lithium, but others such as sodium can be used. When an alkali metal other than the alkali metal being recovered and purified is used in the processing aid source, further separation, such as differential solubility separation, electrochemical separation, and the like, is used to separate the process aid alkali metal from the desired alkali metal.

The processing aid source 3048 also contains an anion that is typically the same as the anion being used to extract the alkali metal in the extraction section 3022. Where sulfuric acid is used as the decoupling agent 3028, the processing aid source 3048 contains sulfate ions. Where hydrochloric acid is used, the processing aid source 3048 includes chloride ions. In the case where lithium is being extracted using sulfate ions, the processing aid source 3048 is an aqueous lithium sulfate source. The processing aid source 3048 may also include decoupling agent, such as sulfuric acid. Total dissolved solids of the processing aid 3048 may be 0.25 wt % to 0.75 wt %. The dissolved salts improve separation in the presence of electric fields in the separator 3042. The processing aid source 3048 may be obtained from any convenient source, one of which is by recycling an aqueous stream from downstream operations such as the third process 104. In embodiments where sulfuric acid is used to extract lithium from the absorbent as lithium sulfate, and where the lithium sulfate is converted to lithium hydroxide in the third process 104, the third process 104 yields a lithium-bearing sulfuric acid stream that can be recycled to the extraction section 3022 as, or with, the decoupling agent 3028, or alternately as, or with, the processing aid source 3048.

An optional scrubbing section 3050 can be used to remove unwanted metals if removal is not performed elsewhere, or is otherwise insufficient. The scrubbing section 3050 can be beneficial where uptake of impurities by the absorbent in the contactor 3006 might result in significant impurities in recovered lithium for downstream processes. Typically, scrubbing will be performed prior to extraction for part, or all of the loaded absorbent. All, or a portion, of the loaded absorbent stream 3016 can thus be routed to a scrubber 3052 (appropriate valving can be used to split flow, if desired, between the scrubber 3052 and other dispositions described below for the loaded absorbent stream 3016). The scrubber 3052 is a contactor/separator unit that contacts loaded absorbent with a decoupling agent to release unwanted impurities from the loaded absorbent. Typically, for simplicity, the same decoupling agent is used for the scrubber 3052 and for the extractor 3024.

The scrubber 3052 is a settler, with a mixer 3054 coupled to an inlet of the settler. Decoupling agent 3028 is routed to the mixer 3054 along with loaded absorbent, where the two streams are intimately mixed. Because the absorbent is selective to a desired metal, such as lithium, impurities are more weakly bound to the absorbent, so less intense decoupling can be used to separate mainly impurities while separating only a small amount of the desired metal. For example, where sodium is to be separated from lithium in the scrubbing section 3050, a 10% molar excess of decoupling agent to sodium can be used. Thus, if sodium loading is 10% of lithium loading in the loaded absorbent, for example, the amount of decoupling agent used for scrubbing can be 10-15% of the amount needed to fully unload metals from the absorbent. Alternately, the decoupling agent can be diluted for use in the scrubbing section 3050. The great majority of sodium will thus be removed, while only a small amount of lithium is removed. The mixer 3054 is configured to provide mixing time and intensity sufficient to unload impurities from the loaded absorbent. The separation effect of the mixer 3054 can be optimized by adjusting mixing time, shear rate, and decoupling agent concentration or amount.

The settler used as the scrubber 3052 can be any type of settler. In one case, an electrical settler is used to maximize throughput. Aqueous and organic streams separate into two phases in the settler. The scrubber organic phase 3058, which is loaded absorbent, is returned to the loaded absorbent line 3016, or otherwise routed to the extraction section 3022. The scrubber aqueous phase 3056, which is decoupling agent along with metals, can be recycled to the contacting section 3004, for example to the lithium-bearing feed stream 3002, to recover desired metals such as lithium.

Figure 3B:
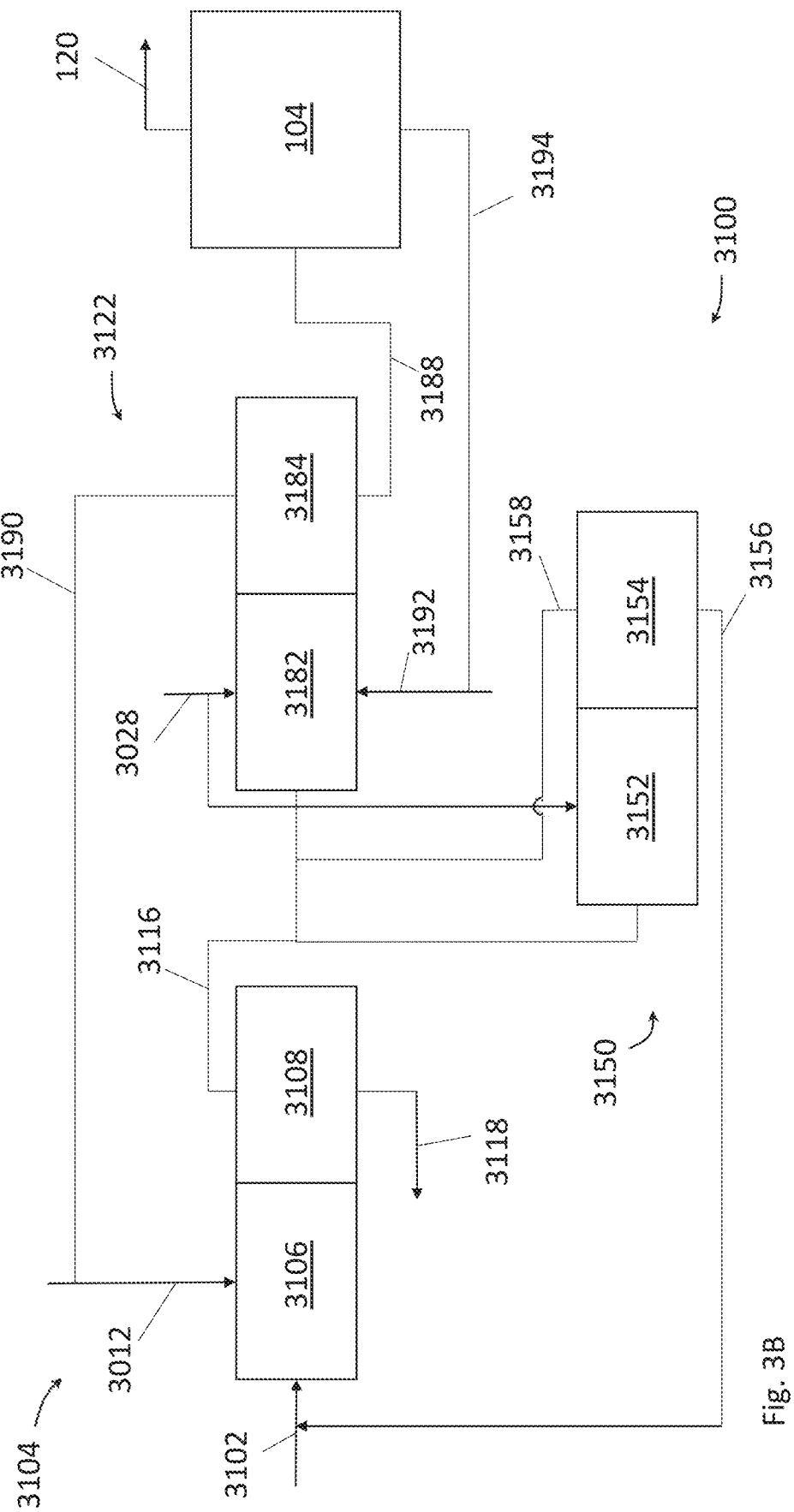
FIG. 3B is a process diagram of a lithium extraction process according to another embodiment.

FIG. 3B is a process diagram of a lithium extraction process 3100 according to another embodiment. Here, a high-concentration lithium-bearing aqueous stream 3102 is contacted with a liquid absorbent in a multi-chamber mixer/settler 3104. The liquid absorbent stream 3012 is provided to a mixing chamber 3106 of the mixer/settler 3104 along with the stream 3102. Here, the high-concentration lithium-bearing aqueous stream can be any of the streams identified as feed streams for the process of FIG. 3A. Mixing is performed in the mixing chamber 3106 by any suitable means, such as powered agitation, pumparound mixing, static and/or dynamic mixers, and the like. High-shear mixing matched to reaction kinetics obtains the best results, but any mixing can be used with sufficient residence time. Residence time in the mixing chamber 3106 is selected to allow time for transportation of lithium from the aqueous phase to the absorbent phase, and mixing is performed to reduce diffusion lengths, and therefore times, in the aqueous phase.

The mixed fluid flows from the mixing chamber 3106 to a settling chamber 3108 of the mixer/settler 3104. The two chambers may be separated by an impermeable barrier, a perforated barrier, or a porous barrier, and flow between the chambers may be accomplished merely by transport through the barrier or by flow through a conduit connecting the two chambers or over a weir separating the two chambers. In-line mixing may be disposed in the conduit to provide additional mixing prior to the settling chamber 3108. In the settling chamber, the aqueous phase and the absorbent phase are allowed to separate into two bulk phases. The separation may be enhanced using any suitable method, such as chemical separation aids and/or energy (heat, electricity). Buoyancy can also be used to speed separation by bubbling gas through the settling chamber 3108. Combinations of settling aids can also be used.

Loaded absorbent 3116 exits the settling chamber 3108 through loaded absorbent line, which is coupled to an extractor 3122. Lithium-depleted aqueous stream 3118 exits the settling chamber 3108, and may be recycled to the first process 102, as described above. The extractor 3122, in this case, is another mixer/settler with an extractor mixing chamber 3182 and an extractor settling chamber 3184, much like the mixer/settler 3104. The loaded absorbent is charged to the extractor mixing chamber 3182, along with aqueous decoupling agent 3028. The fluid is mixed as described above and flowed to the extractor settling chamber 3184, where the fluid is separated by any of the methods described above for the settling chamber 3108.

An aqueous lithium stream, which may be a solution or a slurry depending on the quantity and composition of decoupling agent used relative to the amount of lithium carried by the loaded absorbent 3116, exits the extractor settling chamber 3184 through extractor effluent line 3188 coupled between the extractor effluent and the third process 104. The aqueous lithium stream is processed in the third process 104 to yield a lithium product, for example lithium chloride or lithium hydroxide. Unloaded absorbent exits the extractor settling chamber 3184 through absorbent recycle line 3190, which is coupled between the extractor 3122 and the liquid absorbent stream 3012 provided to the mixer/settler 3104.

A processing aid source 3192 may be used in the extractor 3122 to aid in separating the organic and aqueous phases in the extractor settling chamber 3184. The processing aid may be, or may include, an alkali metal salt solution. The alkali metal may be lithium. The anion for the salt solution is usually the same anion being used to separate the lithium from the absorbent in the extractor 3122. Where sulfuric acid is used as the decoupling agent 3028, the processing aid source 3192 is typically a lithium sulfate solution or slurry. If hydrochloric acid is used, then a lithium chloride solution or slurry may be used. If another alkali metal is used in the processing aid source 3192, further separation is used between the extractor 3122 and the third process 104, or in the finishing stage, to purify the desired alkali metal, in this case lithium. It has been found that the alkali metal processing aid source 3192 aids in separating an alkali metal aqueous stream, such as the aqueous lithium stream exiting in the effluent line 3188, from an organic stream, such as the unloaded absorbent exiting in the absorbent recycle line 3190.

The processing aid source 3192 may be a recycled lithium-containing stream from the third process 104. For example, in one embodiment, the finishing stage converts lithium in a lithium sulfate slurry or solution into lithium hydroxide, yielding a sulfuric acid stream that is recycled in a decoupling agent recycle line 3194. The decoupling agent recycle line 3194 is coupled to the extractor mixing chamber 3182 to deliver recycled decoupling agent to the extractor 3122. Here, the decoupling agent recycle line 3194 is coupled between the third process 104 and the processing aid source 3192, but the decoupling agent recycle line 3194 could be coupled to the decoupling agent stream 3028, or to the loaded absorbent 3116, or to another location of the extractor mixing chamber 3182. The sulfuric acid stream recycled to the extractor 3122 in the decoupling agent recycle line 3194 can be configured, by operation of the third process 104, to contain a desired quantity of lithium salt as processing aid. In such cases, the recycled decoupling agent may be the processing aid source 3192.

It should be noted, in reference to the process 3100 of FIG. 3B, that the extractor 3122 could be replaced by the extraction section 3022 of the FIG. 3A process 3000. Likewise, the extraction section 3022 of the FIG. 3A process 3000 could be replaced by the extractor 3122 of the FIG. 3B process 3100. That is to say, the processes 3000 and 3100 each have a contacting stage where a lithium-bearing aqueous stream is contacted with a liquid absorbent. The two contacting operations in the processes 3000 and 3100 are the contacting section 3004 and the mixer/settler 3104. The processes 3000 and 3100 also have extraction stages where a lithium-bearing organic absorbent is contacted with an aqueous decoupling agent to remove lithium from the organic absorbent. The two extraction stages in the processes 3000 and 3100 are the extraction section 3022 and the extractor 3122. Each of the contacting section 3004 and the mixer/settler 3104 can be paired with either the extraction section 3022 or the extractor 3122. Likewise, each of the extraction section 3022 and the extractor 3122 can be paired with either the contacting section 3004 or the mixer/settler 3104.

The process 3100 may include a scrubber 3150. In this case, the scrubber 3150 is another mixer/settler similar to the mixer/settlers 3104 and extractor 3122. As in the process 3000, the scrubber 3150 contacts all or part of the loaded absorbent 3116 with a small amount of the decoupling agent 3192 or 3194 to release weakly bound impurities from the loaded absorbent. A mixer 3152 of the scrubber 3150 intimately mixes the loaded absorbent with the small amount of decoupling agent, dispersing the decoupling agent within the loaded absorbent. As noted above, because the concentration of impurities absorbed by the loaded absorbent is low relative to the desired metal, and because the absorbent is selective to the desired metal, a lower amount of decoupling agent is used to release the impurities. The mixture moves to a settler 3154 of the scrubber 3150 where two bulk phases separate. The scrubber aqueous phase 3156, containing decoupled metals and decoupling agent, is recycled to the lithium-bearing stream 3102. The scrubber organic phase 3158, which is loaded absorbent depleted of impurities, is returned to the loaded absorbent stream 3116 or otherwise routed to the extractor 3122.

It should also be noted that decoupling agent can be recycled in the process 3000 of FIG. 3A in a manner similar to that shown in the process 3100 of FIG. 3B. As described above, the decoupling agent recycle line 3194 can be coupled between the third process 104 and one or more of the separator 3042, the processing aid source 3048, and the aqueous lithium salt stream 3032.

Figure 3C:
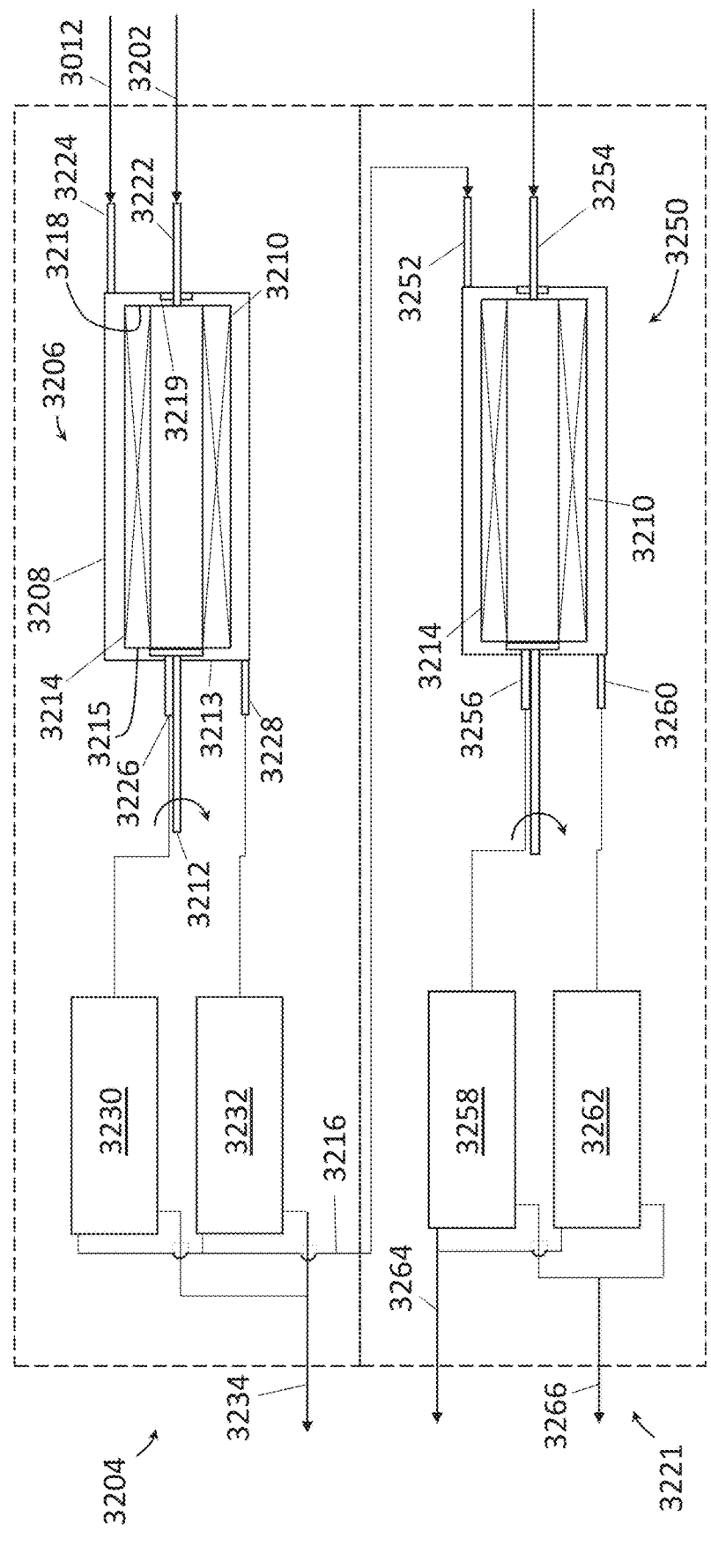
FIG. 3C is a process diagram of a lithium extraction process according to another embodiment.

FIG. 3C is a process diagram of a lithium extraction process 3200 according to another embodiment. The process 3200 of FIG. 3C is similar to the process 3100 of FIG. 3B, except that a different method is used to contact the various materials to perform extraction and recovery. As in the processes 3000 and 3100 of FIGS. 3A and 3B, there are two stages to the process 3200 of FIG. 3C, a contacting stage 3204 and an extraction stage 3221. In each stage, a centrifugal mixer/separator is used to contact an aqueous medium with an organic medium, accomplish material transfer between the two media, and then separate the media. Here, the contacting, transfer, and separation are primarily performed in a single centrifugal mixer/separator.

The contacting stage 3204 has a contactor 3206 that is a liquid centrifuge. The contactor 3206 comprises a vessel 3208 with a rotatable barrel 3210 disposed within the vessel 3208. A rotor 3212 is attached to the barrel 3210 and extends through a wall 3213 of the vessel 3208 along a central axis thereof. The rotor 3212 is sealed at the wall 3213 by conventional means, and is operable to rotate the barrel 3210 within the vessel 3208. The vessel 3208 is operated as a liquid-full vessel, so the rotating barrel 3210 imparts angular momentum to the fluid within the vessel 3208, energizing a density-driven and affinity-driven separation of bulk phases within the vessel 3208. The barrel 3210 has a contacting structure 3214 attached to a first end plate 3215 and a second end plate 3218 opposite from the first end plate 3215. The barrel 3210 may be supported at the distal end by a bearing 3219 attached to an inner end wall of the vessel 3208. The contacting structure 3214 has a cylindrical structure with a hollow interior to provide a mixing zone for fluids within the barrel 3210 moving radially inward and outward according to their respective densities. As the fluids flow radially, they encounter the contacting structure 3214 and are forced into intimate contact by small flow cross-sections and/or shear. The contacting structure 3214 generally rotates with the barrel 3210 to enhance mixing.

The contacting structure 3214 may be a shear structure that applies angular momentum to the liquid within the vessel 3208 to promote mixing of fluid phases within the shear structure. For example, a plurality of nested cylindrical vanes with openings for radial fluid flow may be provided as a shear structure. Such openings may have uniform or diverse size and shape and may be uniformly or non-uniformly spaced. Alternately, the contacting structure 3214 may be a surface area structure, such as a packing, that provides high surface area and very long flow paths in a generally radial direction to promote fluid mixing within the surface area structure. Packing materials that can be used in include various rings, mesh, or other commonly used packing materials. A rotating surface area structure may also provide some shear to the fluids within the contacting structure 3214.

A high-concentration lithium-bearing aqueous stream 3202 is charged to a heavy phase inlet 3222 of the contactor 3206 at a location of the vessel 3208 that is radially and axially peripheral. A liquid absorbent 3012 is charged to a light phase feed 3224 of the contactor 3206 at a location of the vessel 3208 that is radially central and axially peripheral. In this case, the heavy phase inlet 3222 and light phase feed 3224 are located at the same end of the vessel 3208, but they could be located at opposite ends of the vessel 3208 in some cases. The feed locations are selected to promote mixing and residence time of the fluids within the vessel 3208.

The fluids charged to the contactor 3206 mix within the vessel 3208 as the barrel 3210 is rotated. Angular momentum of the heavy fluid charged to the heavy phase inlet 3222 creates outward radial pressure to cause flow of the heavy fluid outward from the central axis of the vessel 3208 toward the radial periphery of the vessel 3208. Flow of the heavy phase outward displaces the light phase inward toward the central axis of the vessel 3208. As the fluids flow through the contacting structure 3214, the fluids mix intimately and may undergo shear, resulting in lithium transfer from the aqueous phase to the organic phase.

The two fluids collect and coalesce into two bulk phases within the vessel 3208, the heavier phase along the periphery of the vessel 3208 and the lighter phase near the central axis of the vessel 3208. The heavier phase, in this case, is the aqueous phase depleted of lithium ions while the lighter phase is the organic absorbent carrying lithium. A loaded absorbent line 3226 is coupled to the vessel 3208 at a central radial location near the central axis thereof to withdraw the loaded absorbent from the vessel 3208. A depleted aqueous line 3228 is coupled to the vessel 3208 at a radial periphery thereof to withdraw the depleted aqueous phase from the vessel 3208.

The effluent streams from the contactor 3206 may be routed to one or more separators in the event residual impurity is present. Here, each stream is shown routed to one separator. Loaded absorbent is routed to a first separator 3230 to remove any residual aqueous material. The first separator 3230 may be any suitable separator, such as a gravity separator, a rotational separator, an electrical separator, a thermodynamic separator such as a distillation or flash unit, or a diffusion separator, or a separator combining multiple separation methods. Depleted aqueous material is routed to a second separator 3232 to recover any residual organic material therein. The second separator 3232 can also be any suitable separator. Separated aqueous material from the first and second separators 3230 and 3232 is combined into a depleted aqueous stream 3234 that is routed to disposal. As noted above, the depleted aqueous stream 3234 can be routed to exchange units in the first process 102, optionally by way of the reverse osmosis unit 220. As also noted above, instead of one single separator, each effluent stream from the contactor 3206 can be processed in a separation train that may include multiple separators of the same type or different types, with feed and effluent streams arranged to accomplish the desired degree of purification of the loaded absorbent and depleted aqueous streams.

Loaded absorbent is recovered and combined into a loaded absorbent line 3216, which is routed to the extraction stage 3221. The extraction stage 3221 is similar to the contacting stage 3204. An extractor 3250, which is a second liquid centrifuge, contacts the loaded absorbent with an aqueous decoupling agent to transfer lithium from the absorbent to the aqueous decoupling agent while concurrently energizing an affinity-driven and density-driven separation of the two materials into two bulk phases. In this case, the extractor 3250 is identical in important respects with the contactor 3206. The loaded absorbent is charged to the light phase inlet 3252 of the extractor, and the decoupling agent, for example sulfuric acid or another acid, is charged to the heavy phase inlet 3254. As before, the heavy phase inlet 3254 is near the central axis of the extractor 3250 at an axial periphery thereof, while the light phase inlet 3252 is axially and radially peripheral. The contacting structure 3214 enhances mixing and rotation of the barrel drives radial separation of the fluids into two bulk phases.

An unloaded absorbent is withdrawn from an unloaded absorbent line 3256 coupled between the vessel 3208 and a third separator 3258, while an aqueous lithium salt stream is withdrawn from an aqueous line 3260 coupled between the vessel 3208 and a fourth separator 3262. Absorbent is withdrawn from the separators 3258 and 3262, combined into a recycle absorbent line 3264, and routed to the contacting stage 3204, to the absorbent stream 3012, the heavy phase inlet 3222 of the contactor 3206, or to another suitable location on the vessel 3208. Aqueous lithium salt solution or slurry is withdrawn from each separator and combined into a clean lithium salt stream 3266, which can then be routed to further processing or sale, for example to the third process 104 of FIG. 1.

As before, in FIG. 3C, the contacting and extraction stages use the same types of contacting and separation equipment, but such equipment could be used in combination with the other types of contacting and separation equipment described above. For example, the centrifugal-type apparatus of the process 3200 could be combined with the tower-type apparatus of the process 3000 or with the mixer/settler-type apparatus of the process 3100. Thus, a centrifugal-type contactor could be combined with a tower-type extractor or with a mixer/settler type extractor, and a centrifugal-type extractor could be combined with a tower-type or mixer/settler-type contactor. Such choices depend on the nature of the streams being processed and the geography and infrastructure available to support the overall process.

Figure 3D:
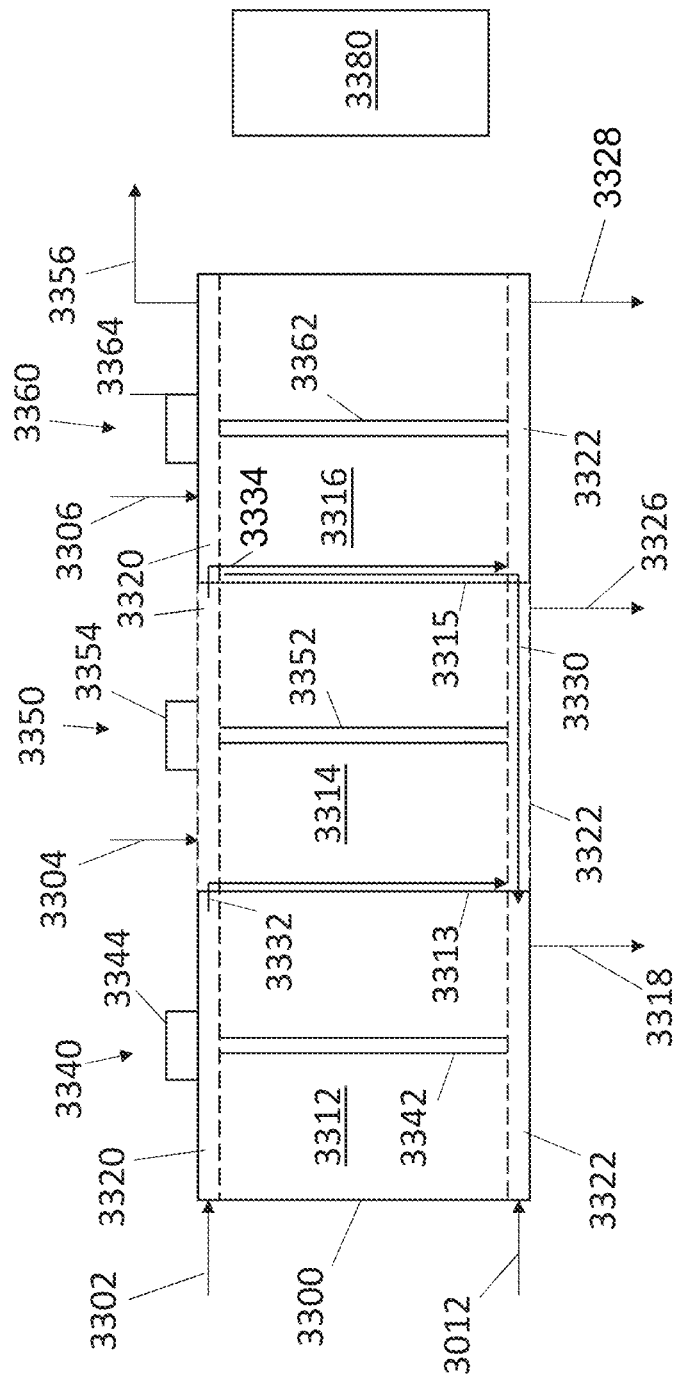
FIG. 3D is a schematic cross-sectional view of a lithium extraction vessel according to one embodiment.

FIG. 3D is a schematic cross-sectional view of a lithium extraction vessel 3300, according to one embodiment. The lithium extraction vessel 3300 has three chambers, a contacting chamber 3312, a scrubbing chamber 3314, and an extraction chamber 3316. The lithium extraction vessel 3300 is operated in continuous-flow mode with a lithium-bearing concentrate stream, a make-up organic absorbent, and a decoupling agent as feed streams and an aqueous lithium salt stream, an organic absorbent purge, and a depleted aqueous stream as effluents. The organic absorbent is recycled within the vessel 3300 from the scrubbing chamber 3314 and the extraction chamber 3316 to the contacting chamber 3312. The three chambers are separated by three partitions, a first partition 3313 separating the contacting chamber 3312 from the scrubbing chamber 3314 and a second partition 3315 separating the scrubbing chamber 3314 from the extraction chamber 3316.

The vessel 3300 accomplishes three contact/separation steps between an organic phase and an aqueous phase. The organic phase is lithium absorbent and the aqueous phase is the lithium-carrying medium for each step. In each chamber, the organic phase is introduced in a lower portion of the chamber and the aqueous phase is introduced in an upper portion of the chamber. Due to the density difference of the phases, the organic phase will flow upward and the aqueous phase will flow downward to afford contact and interaction between the phases. In each chamber, the two phases are introduced using distributors to provide surface area for mixing and material transport between the two phases. The chambers of the vessel 3300 are operated liquid-full, and each chamber is provided with an electrode assembly to generate an electric field in the chamber to enhance mixing and/or separation between the phases.

Each of the contacting chamber 3312, the scrubbing chamber 3314, and the extraction chamber 3316 thus has an aqueous distributor 3320 at an upper part of the respective chamber and an organic distributor 3322 at a lower part of the chamber. Organic and aqueous phases may be transported from one chamber to the other through organic conduits that generally move organic phase from the top portion of one chamber to the organic distributor 3322 at the bottom of another chamber and aqueous conduits that generally move aqueous phase from the bottom portion of one chamber to the aqueous distributor 3320 at the top of another chamber. Pumps are disposed within the vessel 3300 to facilitate flows between chambers. Aqueous and organic streams are recycled within the vessel 3300 using conduits disposed within the vessel 3300. Pumps are used to facilitate the recycle flows.

A high-concentration lithium-bearing aqueous stream 3302 is charged to the aqueous distributor 3320 of the contacting chamber 3312. The absorbent stream 3012 is charged to the organic distributor 3322 of the contacting chamber. In this case, the absorbent stream 3012 is a make-up stream. Additional absorbent is recycled within the vessel 3300 through an absorbent recycle 3330, which may be routed along any convenient pathway within or outside the vessel 3300. In this case, the absorbent recycle 3330 is shown schematically as an arrow. The absorbent recycle 3330 generally withdraws unloaded absorbent from an top portion of the extraction chamber 3316 and routes the unloaded absorbent to the organic distributor 3322 of the contacting chamber 3312. A pump may be used to flow the unloaded absorbent through the conduit 3330.

The aqueous and organic streams are contacted within the contacting chamber 3312. Alternately, the absorbent stream 3012 may be pre-mixed with the lithium-bearing stream 3302, using for example one or more in-line static or dynamic mixers, and provided to the contacting chamber 3312 through either the aqueous distributor 3320 or the organic distributor 3322 of the contacting chamber 3312.

Lithium migrates from the aqueous phase to the organic phase in the contacting chamber 3312. A first electric field unit 3340 applies an electric field to the fluid inside the contacting chamber 3312. The first electric field unit 3340 comprises a first electrode assembly 3342 electrically coupled to a first power unit assembly 3344. The first power unit assembly 3344 applies electric power to the one or more electrodes of the first electrode assembly 3342 to create an electric field between electrodes of the first electrode assembly 3342 and/or between an electrode of the first electrode assembly 3342 and a wall of the contacting chamber 3312. The applied electric field influences behavior of the aqueous phase, higher voltage encouraging smaller aqueous droplets and lower voltage encouraging larger aqueous droplets. It should be noted that the first power unit assembly 3344 may include multiple power units, with multiple electrodes of the first electrode assembly 3342 electrically coupled to the multiple power units of the first power unit assembly 3344 to provide different electric field conditions at different locations in the contacting chamber 3312. Thus, for example, mixing can be encouraged in a central area of the contacting chamber 3312 and separation can be encouraged in the top and bottom areas of the contacting chamber 3312 by applying different electric field conditions using different power circuits.

Aqueous material, depleted of lithium ions by contact with the absorbent, collects and coalesces in the lower portion of the contacting chamber 3312 while absorbent loaded with lithium that has migrated from the aqueous phase to the organic phase collects and coalesces in the upper portion of the contacting chamber 3312. A lithium-depleted aqueous stream 3318 is withdrawn from the contacting chamber 3312 from the lower portion of the contacting chamber 3312 where the aqueous material coalesces and settles in a bulk aqueous phase. The organic phase in the contacting chamber 3312, which is a loaded absorbent, is routed into the scrubbing chamber 3314 through a conduit 3332 that collects loaded absorbent at the upper portion of the contacting chamber 3312 and deliver the loaded absorbent to the organic distributor 3322 at the lower portion of the scrubbing chamber 3314, transiting through the first partition 3313. The conduit 3332 is shown schematically as an arrow in FIG. 3D. A pump may be used to facilitate flow of loaded absorbent through the conduit 3332.

In the scrubbing chamber 3314, the loaded absorbent is contacted with a first decoupling agent stream 3304 to perform a low-intensity decoupling of impurity species from the loaded absorbent. The first decoupling agent stream 3304 is provided to the scrubbing chamber 3314 using the aqueous distributor 3320 of the scrubbing chamber 3314. The decoupling agent of the first decoupling agent stream 3304 is the same decoupling agent used in the extraction chamber 3316, which is provided to the aqueous distributor 3320 of the extraction chamber 3316 as a second decoupling agent stream 3306. The decoupling process performed in the scrubbing chamber 3314 is a low-intensity decoupling process to decouple species weakly bound to the absorbent. Because the absorbent is selective, the absorbent absorbs the selective species more strongly than other impurity species. A low-intensity decoupling process thus preferentially removes the impurity species from the absorbent. The low-intensity decoupling process is performed by using a small volume of the decoupling agent or by using a dilute decoupling agent. The first decoupling agent stream 3304 is thus either smaller in volume than the second decoupling agent stream 3306, or is diluted to have lower strength than the second decoupling agent stream 3306.

Mixing and separation is performed in the scrubbing chamber 3314 in a manner similar to the contacting chamber 3312. A second electric field unit 3350 has a second electrode assembly 3352 electrically coupled to a second power unit assembly 3354. The second electrode assembly 3352 and the second power unit assembly 3354 may be configured the same as the first electrode assembly 3342 and the first power unit assembly 3344, respectively, or may be different, depending on the conditions and volumes selected for operating the scrubbing chamber 3314.

Mixing and separation are performed in the scrubbing chamber 3314, with a bulk organic phase collecting at an upper portion of the scrubbing chamber 3314 and a bulk aqueous phase collecting at a lower portion of the scrubbing chamber 3314. An aqueous impurity stream 3326 is withdrawn from the lower portion of the scrubbing chamber 3314. The aqueous impurity stream 3326 will be a weak acid stream with impurity species, such as divalent and non-lithium monovalent species, and potentially a low concentration of lithium. All, or a portion, of the aqueous impurity stream 3326 can be recycled to the aqueous distributor 3320 of the contacting chamber 3312 to recover any lithium therein and/or to facilitate mixing and separation in the contacting chamber 3312. The recycled aqueous impurity stream may be delivered directly to the aqueous distributor 3320 of the contacting chamber 3312 or may be mixed with the high-concentration lithium-bearing aqueous stream 3302 before delivery to the contacting chamber 3312.

The organic phase of the scrubbing chamber 3314 is a clean loaded absorbent. The clean loaded absorbent is withdrawn from the upper portion of the scrubbing chamber 3314 into a conduit 3334 that transits the second partition 3315 and delivers the clean loaded absorbent to the organic distributor 3322 of the extraction chamber 3316. The second decoupling agent stream 3306 is delivered to the aqueous distributor 3320 of the extraction chamber 3316. In the extraction chamber 3316, the organic and aqueous phases mix and contact to unload lithium from the clean loaded absorbent into the aqueous phase to form a clean lithium salt stream 3328, which is withdrawn from a lower portion of the extraction chamber 3316. As for the contacting and scrubbing chambers 3312 and 3314, a third electric field unit 3360 is provided for the extraction chamber 3316. The third electric field unit 3360 has a third electrode assembly 3362 disposed within the extraction chamber 3316 and a third power unit assembly 3364 electrically coupled to the third electrode assembly 3362 to provide an electric field within the extraction chamber 3316. The third electric field unit 3360 may also be configured with multiple electrodes and power units to provide tailored electric field conditions within the extraction chamber 3316 to promote mixing and settling in different areas of the extraction chamber 3316. An absorbent purge stream 3356 may be withdrawn from an upper portion of the extraction chamber 3316. As described above, at least a portion of the unloaded absorbent that collects at the upper portion of the extraction chamber 3316 is recycled to the contacting chamber 3312 through the absorbent recycle 3330. The vessel 3300 illustrates a lithium processing embodiment provided in a single vessel for compact processing.

The vessel 3300 may include a controller 3380 operatively coupled to flow control devices for the various feed, product, and recycle streams, and to the power units to control operation of the vessel 3300. Various sensors, temperature, pressure, composition, and electrical sensors, may be provided at selected locations to monitor the process, and the controller 3380 may employ advanced process control measures, such as machine learning or other artificial intelligence approaches, to optimize or target the processes of the vessel 3300.

Figure 4:
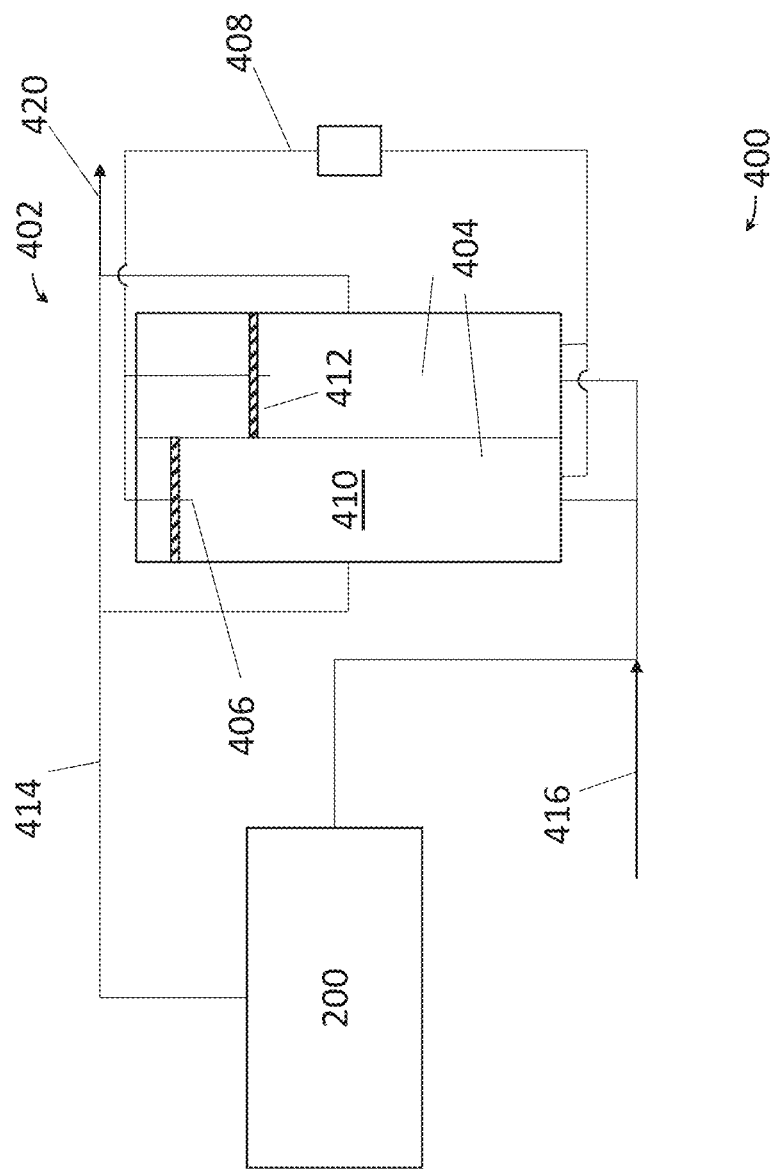
FIG. 4 is a process diagram of a lithium extraction process according to another embodiment.

FIG. 4 is a process diagram of a lithium extraction process 400 according to another embodiment. The lithium extraction process 400 includes the separation process 200 of FIG. 2A and an electrochemical unit 402 as a second process 103. No third process 104 is used in the process 400 since the electrochemical unit 402 produces a salable lithium product. The electrochemical unit 402 includes a vessel 404 with an electrode 406 electrically coupled to a power circuit 408. In one embodiment, the electrochemical unit 402 operates by intercalating lithium into a lithium-selective electrode, for example a manganese-containing electrode, until an endpoint is reached. The electrode is powered with a voltage selective for lithium uptake. The vessel 404 is then flushed and filled with fresh water or a dilute lithium salt solution. Finally the potential is reversed on the electrode 406 to release the lithium from the electrode into the solution.

The electrochemical unit 402 can be operated as a concentrator/purifier by providing a variable volume interior for the vessel 404. The vessel 404 has an interior 410 that may contain a separator material. The electrode 406 may be disposed on a movable plate 412 that can be positioned to provide a variable volume interior for the vessel 404. During lithium uptake, the movable plate 412 can be positioned at the full volume position to maximize exposure of brine to electrochemical processing in the vessel 404. After the endpoint is reached and the vessel 404 is flushed, the movable plate 412 can be positioned at a reduced volume position. When the reduced volume interior is filled with dilute brine to perform the release process, the lithium will be released into a smaller volume of water so that resulting solution will be concentrated.

The electrochemical unit 402 has two or more of the vessels 404 to provide continuous operation. As an endpoint is reached in one of the vessels 404, concentrate from the separation process 200 can be diverted to another of the vessels 404, while the first vessel 404 is unloaded and prepared for lithium extraction. As before with other embodiments described above, monovalent depleted brine from the electrochemical unit 402 can be routed to the separation process 200 for use as a flush medium, optional through a reverse osmosis or other purification unit. During lithium uptake operation, a monovalent depleted stream 414 is withdrawn from the vessel, or vessels, 404 and can be routed back to the separation process 200 for use as flush water, optionally through a reverse osmosis unit as described above. During lithium release operation, clean water is provided to the vessel, or vessels 404, through clean water line 416, which may be obtained from a reverse osmosis unit as described above. Lithium is unloaded from the electrode 406 into the clean water to form a lithium product stream that is withdrawn through lithium product line 420. Note that flow control devices are omitted for simplicity.

Each of the vessels 404 can be operated in continuous flow mode until an endpoint is reached, or in semi-batch mode. In continuous flow mode, an aqueous lithium-bearing stream such as the lithium-bearing effluent 214 of the resin unit 202 can be charged to one of the vessels 404 continuously while powering the electrode 406. As the lithium-bearing stream flows through the vessel 404, the electrode 406 continuously absorbs lithium from the lithium-bearing stream. Absorption rate is influenced by flow rate of fluid through the vessel 404 and electrical current flowing through the electrode 406. Endpoint can be detected by monitoring current flow through the electrode 406. A drop in current flow at steady voltage indicates approach of an endpoint where the electrochemical extraction effectiveness of the electrode is being impeded by lithium ion saturation.

To operate the vessels 404 in semi-batch mode, an aliquot of the lithium-bearing stream is loaded into one vessel 404 and the electrode 406 is powered at the lithium-selective voltage until current drops, indicating either lithium saturation of the electrode or lithium depletion of the aqueous medium in the vessel 404. At that time, the lithium depleted aqueous medium can be flush and new lithium-bearing material loaded into the vessel 404. An endpoint is reached when an initial current using new lithium-bearing brine is significantly below previous initial currents. At that time, the vessel 404 can be flushed and unloaded. In semi-batch mode, two or more vessels 404 can provide quasi-continuous operation by alternating loading and unloading operations. For semi-batch operation, four vessels 404 provides more continuous operation because one pair of vessels can be operated in lithium uptake while the other pair of vessels is operated in lithium unloading.

Processes that can be used for the third process 104 include electrolysis and crystallization processes. An electrolysis process can be used to convert a lithium salt solution or slurry into lithium hydroxide, yielding an acid stream in the process that can be recycled to the second process 103 as a decoupling agent or processing aid for separation. A crystallization process uses evaporation and/or filtering to isolate lithium salt crystals. The liquid eluent can also be recycled to upstream processes, such as the reverse osmosis unit 220 (FIG. 2A).

Presented herein are embodiments of an integrated lithium recovery process that subjects a lithium-containing brine to anionic ion exchange to concentrate and purify the lithium and to an extraction process to bring the lithium to a form that can be sold directly or finished into a saleable product. The processes described herein have the ability to optimize use of water and organic process aids, and to minimize impact on the environment from returned water. Some processes described herein provide lithium recovery in a compact footprint while maximizing use of process water and processing aids.

We claim:

1. A method of recovering alkali metals from an aqueous source, the method comprising:
removing divalent ions from the aqueous source by exposing the aqueous source to an intercalated resin that absorbs alkali metals;
flushing the intercalated resin using a clean water stream to produce an aqueous divalent depleted stream;
extracting alkali metals from the aqueous divalent depleted stream to produce a concentrated monovalent stream and a monovalent depleted stream, wherein the extracting the alkali metals from the aqueous divalent depleted stream comprises contacting the aqueous divalent depleted stream with a liquid absorbent to form a loaded absorbent and the monovalent depleted stream, wherein the contacting the aqueous divalent depleted stream with the liquid absorbent comprises:

intimately mixing the aqueous divalent depleted stream with the liquid absorbent to form a multi-phase mixture; and separating the multi-phase mixture into the loaded absorbent and the monovalent depleted stream using an electrical separator; and routing the monovalent depleted stream to a purification process to produce the clean water stream.

2. The method of claim 1, further comprising recovering additional alkali metals from the concentrated monovalent stream.

3. The method of claim 1, wherein the extracting the alkali metals from the aqueous divalent depleted stream further comprises using a processing aid comprising an alkali metal.

4. The method of claim 1, wherein the extracting the alkali metals from the aqueous divalent depleted stream further comprises performing a liquid desorption process on the loaded absorbent to form the concentrated monovalent stream.

5. The method of claim 1, wherein the intimately mixing the aqueous divalent depleted stream with the liquid absorbent is performed in a mixing zone of the electrical separator.

6. The method of claim 1, wherein the extracting the alkali metals from the aqueous divalent depleted stream further comprises performing an electrochemical reaction using selective electrochemical conditions to isolate a desired alkali metal and form the monovalent depleted stream, and hydrating the isolated alkali metal to form the concentrated monovalent stream.

7. The method of claim 5, further comprising recovering additional alkali metals from the concentrated monovalent stream.

8. The method of claim 5, wherein the extracting the alkali metals from the aqueous divalent depleted stream further comprises using a processing aid comprising an alkali metal.

9. The method of claim 5, wherein the extracting the alkali metals from the aqueous divalent depleted stream further comprises performing a liquid desorption process on the loaded absorbent to form the concentrated monovalent stream.

10. The method of claim 5, wherein the extracting the alkali metals from the aqueous divalent depleted stream further comprises performing an electrochemical reaction using selective electrochemical conditions to isolate a desired alkali metal and form the monovalent depleted stream, and hydrating the isolated alkali metal to form the concentrated monovalent stream.

* * * * *